US011778518B2

(12) United States Patent
Huang et al.

(10) Patent No.: US 11,778,518 B2
(45) **Date of Patent: *Oct. 3, 2023**

(54) METHOD AND APPARATUS FOR DEVICE-TO-DEVICE SIDELINK RESOURCE SELECTION IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 142 days.

This patent is subject to a terminal disclaimer.

(21) Appl. No.: 17/476,029

(22) Filed: Sep. 15, 2021

(65) Prior Publication Data

US 2022/0007237 A1 Jan. 6, 2022

Related U.S. Application Data

(63) Continuation of application No. 17/185,661, filed on Feb. 25, 2021, now Pat. No. 11,178,578.
(Continued)

(51) Int. Cl.
*H04W 28/26* (2009.01)
*H04L 5/00* (2006.01)
(Continued)

(52) U.S. Cl.
CPC .......... *H04W 28/26* (2013.01); *H04B 17/382* (2015.01); *H04L 5/0035* (2013.01);
(Continued)

(58) Field of Classification Search
CPC .......... H04J 3/16; H04L 5/1438; H04L 29/08; H04L 47/76; H04L 47/821; H04W 40/12;
(Continued)

(56) References Cited

U.S. PATENT DOCUMENTS 11,178,578 B2 * 11/2021 Huang .................. H04W 28/26
2019/0394786 A1 * 12/2019 Parron .................. H04L 5/0032
(Continued)

FOREIGN PATENT DOCUMENTS

WO WO-2019148506 A1 * 8/2019

OTHER PUBLICATIONS

S. -Y. Lien et al., "3GPP NR Sidelink Transmissions Toward 5G V2X," in IEEE Access, vol. 8, pp. 35368-35382, 2020, doi: 10.1109/ACCESS.2020.2973706. (Year: 2020).*
(Continued)

*Primary Examiner* — Salvador E Rivas
(74) *Attorney, Agent, or Firm* — Blue Capital Law Firm, P.C.

(57) ABSTRACT

A method and apparatus are disclosed from the perspective of a first device for performing sidelink transmission in a sidelink resource pool. In one embodiment, the first device has a configuration of the sidelink resource pool, wherein the sidelink resource pool is enabled with resource reservation for different Transport Blocks (TBs). The first device also has a configuration of a list of reserved periods. Furthermore, the first device selects or determines a first reserved period from the list of reserved periods, wherein the first selected or determined reserved period is within a first set of reserved periods. In addition, the first device randomly selects a first integer in a first interval, wherein the first interval is based on a scaling factor and a second interval, and the scaling factor is derived based on a largest reserved period in the first set of reserved periods, and wherein the first integer indicates a number of transmission opportunities of different TBs with the first reserved period. The first device further performs sidelink transmission of one TB on one transmission opportunity from the number of transmission opportunities.

20 Claims, 17 Drawing Sheets

START
1400
1405 The first device has a configuration of the sidelink resource pool, wherein the sidelink resource pool is enabled with resource reservation for different TBs
1410 The first device has a configuration of a list of reserved periods
1415 The first device selects or determines a first reserved period from the list of reserved periods, wherein the first selected or determined reserved period is within a first set of reserved periods
1420 The first device randomly selects a first integer in a first interval, wherein the first interval is based on a scaling factor and a second interval, and the scaling factor is derived based on a largest reserved period in the first set of reserved periods, and wherein the first integer indicates a number of transmission opportunities of different TBs with the first reserved period
1425 The first device performs sidelink transmission of one TB on one transmission opportunity from the number of transmission opportunities
END

Related U.S. Application Data

(60) Provisional application No. 62/990,725, filed on Mar. 17, 2020.

(51) Int. Cl.

| | |
|---|---|
| ***H04L 12/28*** | (2006.01) |
| ***H04W 72/0446*** | (2023.01) |
| ***H04L 5/14*** | (2006.01) |
| ***H04W 40/12*** | (2009.01) |
| ***H04B 17/382*** | (2015.01) |
| ***H04W 72/04*** | (2023.01) |
| ***H04L 47/70*** | (2022.01) |
| ***H04L 47/76*** | (2022.01) |
| *H04W 4/46* | (2018.01) |
| *H04J 3/16* | (2006.01) |

(52) U.S. Cl.
CPC ........ *H04L 5/1438* (2013.01); *H04L 12/2869* (2013.01); *H04L 47/76* (2013.01); *H04L 47/826* (2013.01); *H04W 40/12* (2013.01); *H04W 72/04* (2013.01); *H04W 72/0446* (2013.01); *H04J 3/16* (2013.01); *H04W 4/46* (2018.02)

(58) Field of Classification Search
CPC ... H04W 72/04; H04W 72/005; H04W 28/26; H04B 17/382
See application file for complete search history.

(56) References Cited

U.S. PATENT DOCUMENTS

| | | | | |
|---|---|---|---|---|
| 2020/0275458 | A1* | 8/2020 | Khoryaev | H04W 92/18 |
| 2022/0346064 | A1* | 10/2022 | Chae | H04W 72/0446 |
| 2023/0037889 | A1* | 2/2023 | Yao | H04W 72/0453 |

OTHER PUBLICATIONS

Toghi et al., "Multiple Access in Cellular V2xX: Performance Analysis in Highly Congested Vehicular Networks", 2018 (Year: 2018).*

* cited by examiner

| DCI format | Search Space |
| --- | --- |
| DCI format 5A | For PDCCH: Common and UE specific by C-RNTI<br>For EPDCCH: UE specific by C-RNTI |

FIG. 5 (PRIOR ART)

| SL index field in DCI format 5A | Indicated value *m* |
| --- | --- |
| '00' | 0 |
| '01' | 1 |
| '10' | 2 |
| '11' | 3 |

FIG. 6 (PRIOR ART)

| Resource reservation field in SCI format 1 | Indicated value *X* | Condition |
|---|---|---|
| '0001', '0010', ..., '1010' | Decimal equivalent of the field | The higher layer decides to keep the resource for the transmission of the next transport block and the value *X* meets $1 \leq X \leq 10$. |
| '1011' | 0.5 | The higher layer decides to keep the resource for the transmission of the next transport block and the value *X* is 0.5. |
| '1100' | 0.2 | The higher layer decides to keep the resource for the transmission of the next transport block and the value *X* is 0.2. |
| '0000' | 0 | The higher layer decides not to keep the resource for the transmission of the next transport block. |
| '1101', '1110', '1111' | Reserved | |

FIG. 7 (PRIOR ART)

| | **Reserved period** | **First number and/or Tscal_1, or Second number and/or Tscal_2** |
|---|---|---|
| 0 | 2ms | First number= 25 and/or Tscal_1=50 |
| 1 | 1ms | First number= 50 and/or Tscal_1=50 |
| .. | | |
| 15 | 100ms | N/A, or Second number= 1, and/or Tscal_2=100 |

FIG. 9

| Period in the first set of reserved period | The first number is determined based on | The first number for the period |
| --- | --- | --- |
| 1~step-1 | step | Tscal_1/step, or Tscal_2/step, preferably with ceil operation or floor operation |
| step~2*step-1 | 2*step | Tscal_1/(2*step), or Tscal_2/(2*step), , preferably with ceil operation or floor operation |
| 2*step~3*step-1 | 3*step | Tscal_1/(3*step), or Tscal_2/(3*step), , preferably with ceil operation or floor operation |
| ... | ... | ... |
| (N-1)*step~N*step-1 | N*step | Tscal_1/(N*step), or Tscal_2/(N*step), , preferably with ceil operation or floor operation |

FIG. 11

METHOD AND APPARATUS FOR DEVICE-TO-DEVICE SIDELINK RESOURCE SELECTION IN A WIRELESS COMMUNICATION SYSTEM

CROSS-REFERENCE TO RELATED APPLICATIONS

This application is a Continuation of U.S. patent application Ser. No. 17/185,661, filed Feb. 25, 2021, which claims the benefit of U.S. Provisional Patent Application Ser. No. 62/990,725 filed on Mar. 17, 2020, the entire disclosure of which is incorporated herein in its entirety by reference.

FIELD

This disclosure generally relates to wireless communication networks, and more particularly, to a method and apparatus for device-to-device sidelink resource selection in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device for performing sidelink transmission in a sidelink resource pool. In one embodiment, the first device has a configuration of the sidelink resource pool, wherein the sidelink resource pool is enabled with resource reservation for different Transport Blocks (TBs). The first device also has a configuration of a list of reserved periods. Furthermore, the first device selects or determines a first reserved period from the list of reserved periods, wherein the first selected or determined reserved period is within a first set of reserved periods. In addition, the first device randomly selects a first integer in a first interval, wherein the first interval is based on a scaling factor and a second interval, and the scaling factor is derived based on a largest reserved period in the first set of reserved periods, and wherein the first integer indicates a number of transmission opportunities of different TBs with the first reserved period. The first device further performs sidelink transmission of one TB on one transmission opportunity from the number of transmission opportunities.

BRIEF DESCRIPTION OF THE DRAWINGS

FIG. 5 is a reproduction of Table 14.2-2 of 3GPP TS 36.213 V15.4.0.

FIG. 6 is a reproduction of Table 14.2.1-114.2-2 of 3GPP TS 36.213 V15.4.0.

FIG. 7 is a reproduction of Table 14.2.1-2 of 3GPP TS 36.213 V15.4.0.

FIG. 9 is a table according to one exemplary embodiment.

FIG. 11 is a table according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.321 V15.4.0 (2018 December), "E-UTRA; Medium Access Control (MAC) protocol specification (Release 15)"; TS 36.213 V15.4.0 (2018 December), "E-UTRA; Physical layer procedures (Release 15)"; TS 36.212 V15.4.0 (2018 December), "E-UTRA); Physical layer; Multiplexing and channel coding (Release 15)"; TS 36.211 V15.4.0 (2018 December), "E-UTRA); Physical layer; Physical channels and modulation (Release 15)"; TS 36.214 V15.3.0 (2018 September), "E-UTRA); Physical layer; Measurements (Release 15)"; RP-182111, "Revised SID: Study on NR V2X", LG Electronics; R1-1913680, "Introduction of V2X in NR", Samsung; R1-1913643, "Introduction of NR V2X", Nokia;

R1-1913601, "Summary of RAN1 Agreements/Working assumptions in WI 5G V2X with NR sidelink", LG Electronics; R1-1913642, "Introduction of 5G V2X sidelink features into TS 38.212", Huawei; Running CR to TS 38.331 for 5G V2X with NR sidelink_v11, Huawei; Draft Report of 3GPP TSG RAN WG1 #100-e v0.1.1; and R1-2000566, "Remaining details on mode-2 resource allocation", Futurewei. The standards and documents listed above are hereby expressly incorporated by reference in their entirety.

Figure 1:
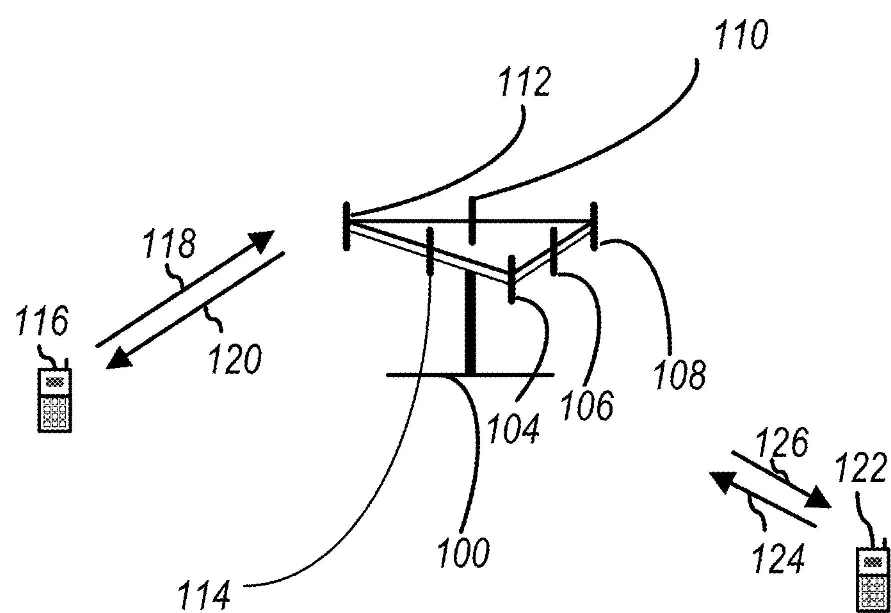
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
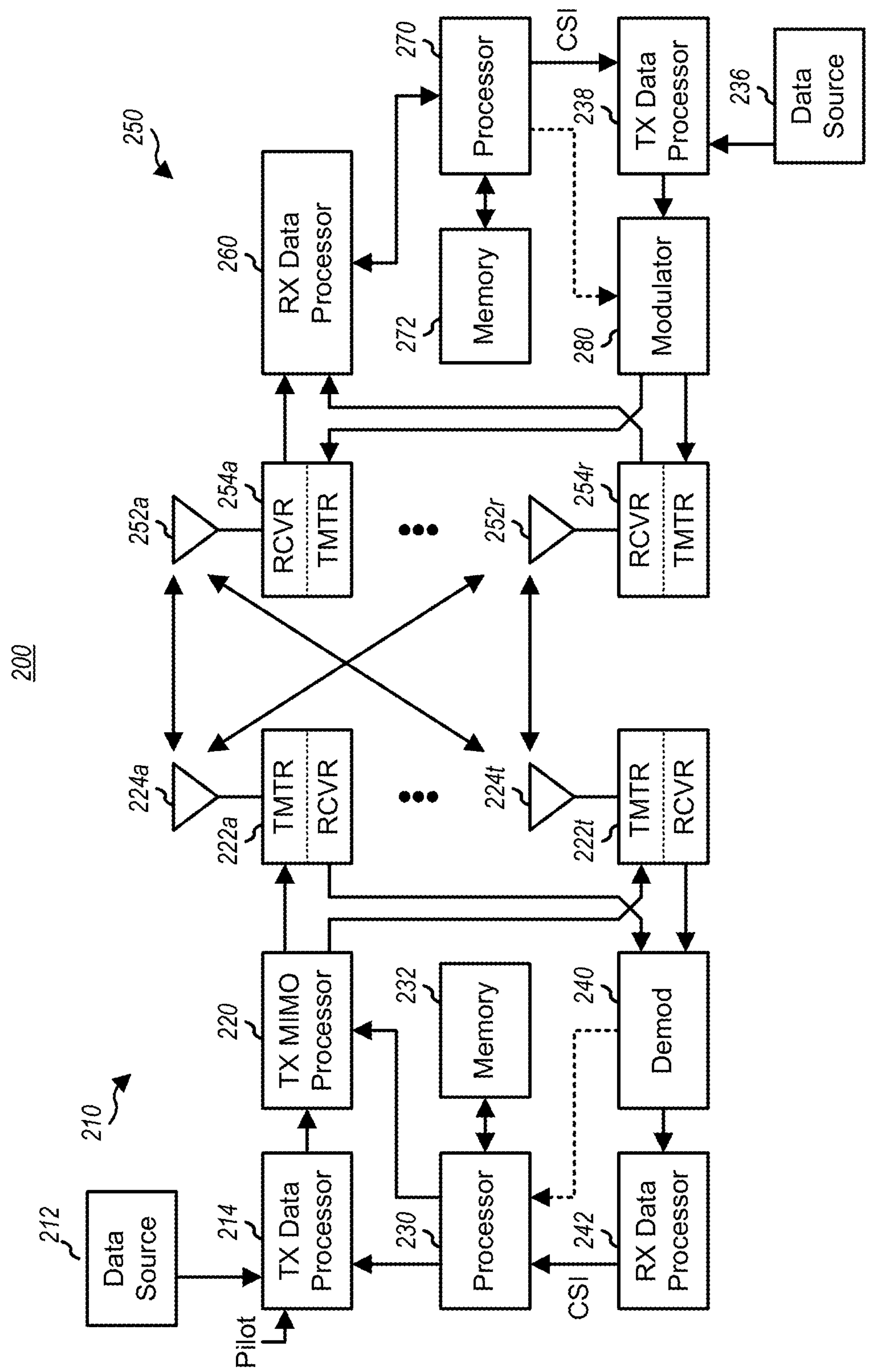
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
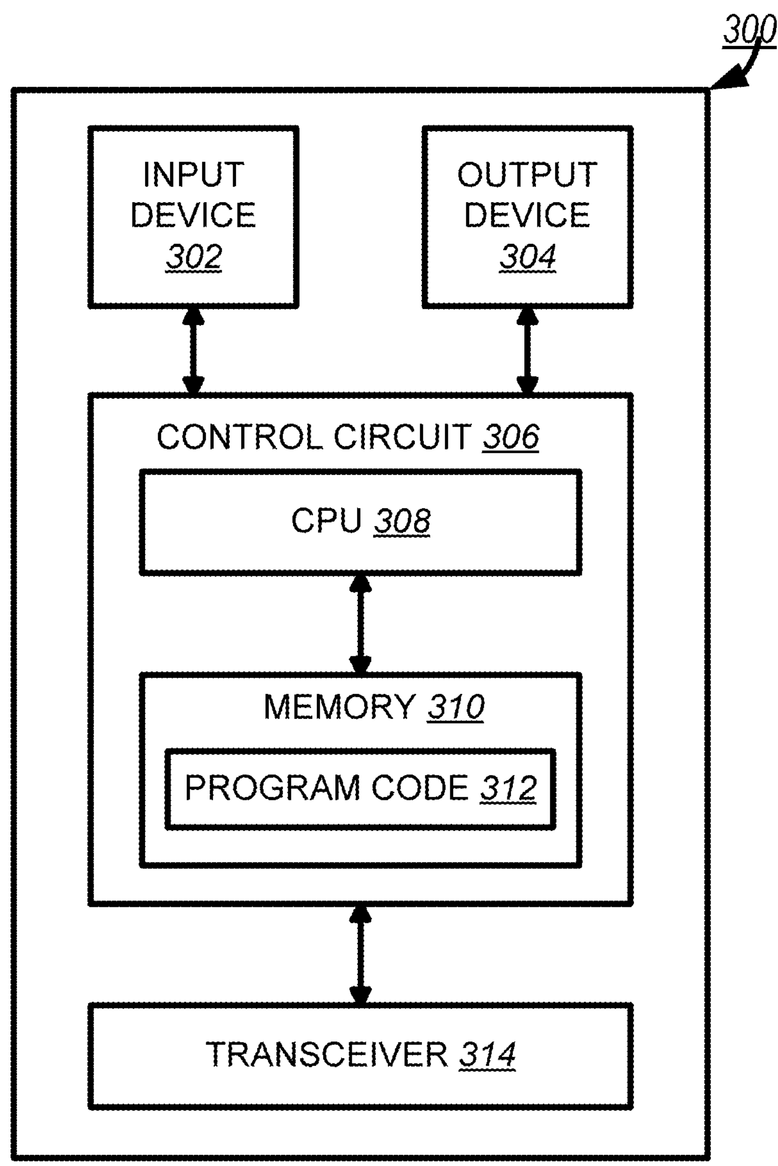
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
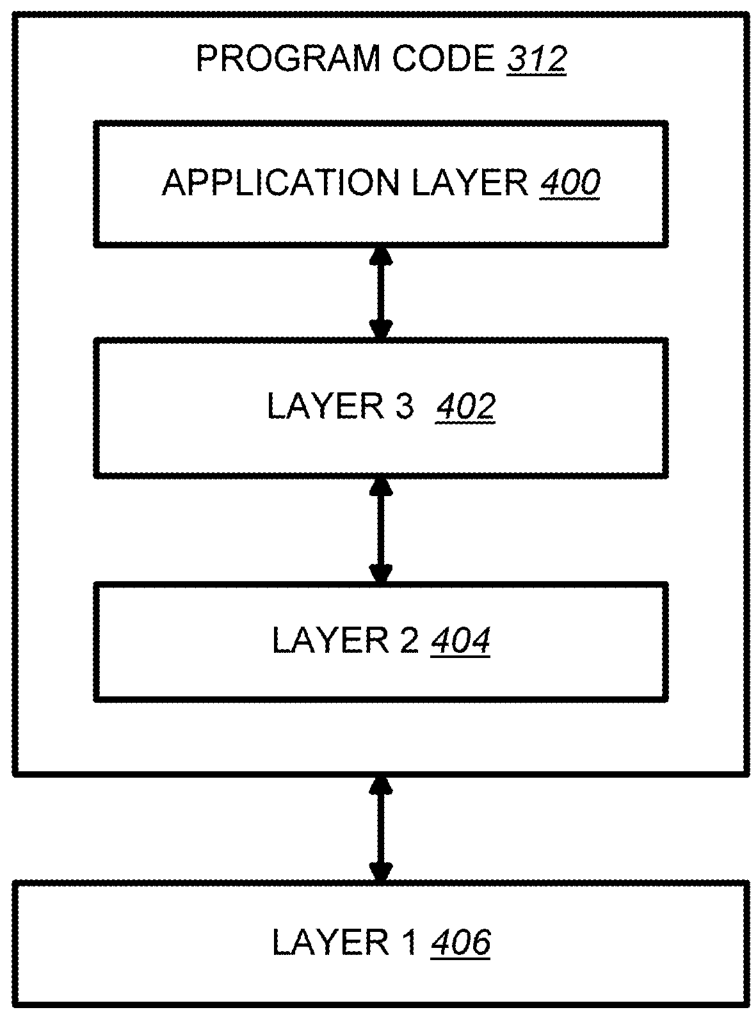
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.321 specifies resource selection procedure for Vehicle-to-Everything (V2X) transmission in LTE/LTE-A as follows:

5.14.1.1 SL Grant Reception and SCI Transmission

[ . . . ]

if the MAC entity is configured by upper layers to transmit using pool(s) of resources in one or multiple carriers as indicated in subclause 5.10.13.1 of TS 36.331 [8] based on sensing, or partial sensing, or random selection only if upper layers indicates that transmissions of multiple MAC PDUs are allowed according to subclause 5.10.13.1a of TS 36.331 [8], and the MAC entity selects to create a configured sidelink grant corresponding to transmissions of multiple MAC PDUs, and data is available in STCH associated with one or multiple carriers, the MAC entity shall for each Sidelink process configured for multiple transmissions:

if there is no configured sidelink grant on any carrier allowed for the STCH associated with the Sidelink process as indicated by upper layers, as specified in TS 24.386 [15]:

trigger the TX carrier (re-)selection procedure as specified in sub-clause 5.14.1.5;

else if there is a configured sidelink grant associated with the Sidelink process:

if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or if neither transmission nor retransmission has been performed by the MAC entity on any resource indicated in the configured sidelink grant during the last second; or if sl-ReselectAfter is configured and the number of consecutive unused transmission opportunities on resources indicated in the configured sidelink grant is equal to sl-ReselectAfter; or if none of the configured sidelink grant(s) on the carrier(s) allowed for the STCH have radio resources available in this TTI to accommodate a RLC SDU according to subclause 5.14.1.3.1 by using the maximum allowed MCS configured by upper layers in maxMCS-PSSCH and the MAC entity selects not to segment the RLC SDU; or NOTE 4: If none of the configured sidelink grant(s) on the carrier(s) allowed for the STCH have radio resources available in this TTI to accommodate the RLC SDU according to subclause 5.14.1.3.1, it is left for UE implementation whether to perform segmentation or sidelink resource reselection.

if none of the configured sidelink grant(s) on the carrier(s) allowed for the STCH have radio resources available in this TTI, according to subclause 5.14.1.3.1 to fulfil the latency requirement of the data in a sidelink logical channel according to the associated PPPP, and the MAC entity selects not to perform transmission(s) corresponding to a single MAC PDU; or NOTE 5: If the latency requirement is not met, it is left for UE implementation whether to perform transmission(s) corresponding to single MAC PDU or sidelink resource reselection.

if the pool of resources where the sidelink grant is configured for the Sidelink process, is reconfigured by upper layers:

clear the configured sidelink grant;

flush the HARQ buffer associated to the Sidelink process;

trigger the TX carrier (re-)selection procedure as specified in sub-clause 5.14.1.5;

if the TX carrier (re-)selection procedure is triggered in above and the carrier is (re-) selected in the Tx carrier (re-)selection according to sub-clause 5.14.1.5, the following is performed on the selected carrier:

select one of the allowed values configured by upper layers in restrictResourceReservationPeriod and set the resource reservation interval by multiplying 100 with the selected value;

NOTE 6: How the UE selects this value is up to UE implementation.

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers according to TS 36.214 [6] if CBR measurement results are available or the corresponding defaultTxConfigIndex configured by upper layers if CBR measurement results are not available;

select an amount of frequency resources within the range that is configured by upper layers between minSubchannel-NumberPSSCH and maxSub-channel-NumberPSSCH included in pssch-TxConfigList and, if configured by upper layers, overlapped between minSubchannel-Num-berPSSCH and maxSubchannel-NumberPSSCH indicated in cbr-pssch-TxConfigList for the highest priority of the sidelink logical channel(s) allowed on the selected carrier and the CBR measured by lower layers according to TS 36.214 [6] if CBR measurement results are available or the corresponding defaultTxConfigIndex configured by upper layers if CBR measurement results are not available;

if transmission based on random selection is configured by upper layers:

randomly select the time and frequency resources for one transmission opportunity from the resource pool, according to the amount of selected frequency resources. The random function shall be such that each of the allowed selections can be chosen with equal probability;

else:

randomly select the time and frequency resources for one transmission opportunity from the resources indicated by the physical layer according to subclause 14.1.1.6 of TS 36.213 [2], according to the amount of selected frequency resources. The random function shall be such that each of the allowed selections can be chosen with equal probability;

[ . . . ]

else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

clear the configured sidelink grant, if available;

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

use the previously selected sidelink grant for the number of transmissions of the MAC PDUs determined in subclause 14.1.1.4B of TS 36.213 [2] with the resource reservation interval to determine the set of subframes in which transmissions of SCI and SL-SCH occur according to subclauses 14.2.1 and 14.1.1.4B of TS 36.213 [2];

consider the selected sidelink grant to be a configured sidelink grant;

3GPP TS 36.213 specifies the UE procedure for V2X transmission in LTE/LTE-A as shown below. The V2X transmissions are performed as sidelink transmission mode 3 or sidelink transmission mode 4 as discussed below.

14 UE Procedures Related to Sidelink

A UE can be configured by higher layers with one or more PSSCH resource configuration(s). A PSSCH resource configuration can be for reception of PSSCH, or for transmission of PSSCH. The physical sidelink shared channel related procedures are described in Subclause 14.1.

A UE can be configured by higher layers with one or more PSCCH resource configuration(s). A PSCCH resource configuration can be for reception of PSCCH, or for transmission of PSCCH and the PSCCH resource configuration is associated with either sidelink transmission mode 1, 2, 3 or sidelink transmission mode 4. The physical sidelink control channel related procedures are described in Subclause 14.2.

[ . . . ]

14.1 Physical Sidelink Shared Channel Related Procedures 14.1.1 UE Procedure for Transmitting the PSSCH

[ . . . ]

14.1.1.6 UE Procedure for Determining the Subset of Resources to be Reported to Higher Layers in PSSCH Resource Selection in Sidelink Transmission Mode 4 and in Sensing Measurement in Sidelink Transmission Mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.413.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}$=10*SL_RESOURCE_RESELECTION_COUNTER, where SL_RESOURCE_RESELECTION_COUNTER is provided by higher layers [11].

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subcH}-1$. The UE shall assume that any set of $L_{subCH}$ contiguous sub-channels included in the corresponding PSSCH resource pool (described in 14.1.5) within the time interval $[n+T_1, n+T_2]$ corresponds to one candidate single-subframe resource, where selections of $T_1$ and $T_2$ are up to UE implementations under $T_1 \leq 4$; and $T_{2\ min}(prio_{TX}) \leq T_2 \leq 100$, if $T_{2\ min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.
2) The UE shall monitor subframes $t_{n'-10\times P_{step}}^{SL}$, $t_{n'-10\times P_{step}+1}^{SL}$, . . . , $t_{n'-1}^{SL}$ except for those in which its transmissions occur, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$. The UE shall perform the behaviour in the max following steps based on PSCCH decoded and S-RSSI measured in these subframes.
3) The parameter $Th_{a,b}$ is set to the value indicated by the i-th SL-ThresPSSCH-RSRP field in SL-ThresPSSCH-RSRP-List where i=a*8+b+1.
4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE has not monitored subframe $t_z^{SL}$ in Step 2.

there is an integer j which meets $y+j\times P_{rsvp\_TX}=z+P_{step}\times k\times q$ where j=0, 1, . . . , $C_{resel}-1$ $P'_{rsvp\_TX}=P_{step}\times P_{rsvp\_TX}/100$, k is any value allowed by the higher layer parameter restrictResourceReservationPeriod and q=1, 2, . . . , Q. Here, Q=1/k if k<1 and $n'-z\le P_{step}\times k$, where $t_{n'}^{SL}=n$ if subframe n belongs to the set $t_0^{SL}, t_1^{SL}, \ldots, t_{T_{max}}^{SL}$, otherwise subframe $t_{n'}^{SL}$ is the first subframe belonging to the set $t_0^{SL}, t_1^{SL}, \ldots, t_{T_{max}}^{SL}$ after subframe n; and Q=1 otherwise.

6) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.

PSSCH-RSRP measurement according to the received SCI format 1 is higher than $Th_{prio_{TX},prio_{RX}}$.

the SCI format received in subframe $t_m^{SL}$ or the same SCI format 1 which is assumed to be received in subframe(s) $t_{m+q\times P_{step}\times P_{rsvp\_RX}}^{SL}$ determines according to 14.1.1.4C the set of resource blocks and subframes which overlaps with $R_{x,\ y+j\times P'_{rsvp\_TX}}$ for q=1, 2, . . . , Q and j=0, 1, . . . , $C_{resel}-1$. Here, $$Q=\frac{1}{P_{rsvp\_RX}}\ \text{if}\ P_{rsvp\_RX}<1$$

and $n'-m\le P_{step}\times P_{rsvp\_RX}$, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$; otherwise Q=1.

7) If the number of candidate single-subframe resources remaining in the set $S_A$ is smaller than $0.2\cdot M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, . . . , $L_{subCH}-1$ in the monitored subframes in Step 2 that can be expressed by $t_{y-P_{step}*j}^{SL}$ fora non-negative integer j if $P_{rsvp\_TX}\ge 10$, and $t_{y-P'_{rsvp\_TX}*j}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2\cdot M_{total}$, 10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

[ . . . ]

14.2 Physical Sidelink Control Channel Related Procedures

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

Table 14.2-2 of 3GPP TS 36.213 V15.4.0, Entitled "PDCCH/EPDCCH Configured by SL-V-RNTI or SL-SPS-V-RNTI", is Reproduced as FIG. 5

The carrier indicator field value in DCI format 5A corresponds to v2x-InterFreqInfo.

14.2.1 UE Procedure for Transmitting the PSCCH

[ . . . ]

For sidelink transmission mode 4,

The UE shall determine the subframes and resource blocks for transmitting SCI format 1 as follows:

SCI format 1 is transmitted in two physical resource blocks per slot in each subframe where the corresponding PSSCH is transmitted.

If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.

If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$, where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

the UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation field according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$, among {0, 3, 6, 9} in each PSCCH transmission.

Table 14.2.1-114.2-2 of 3GPP TS 36.213 V15.4.0, Entitled "Mapping of DCI Format 5A Offset Field to Indicated Value m", is Reproduced as FIG. 6

Table 14.2.1-2 of 3GPP TS 36.213 V15.4.0, Entitled "Determination of the Resource Reservation Field in SCI Format 1", is Reproduced as FIG. 7

14.2.2 UE Procedure for Receiving the PSCCH

For each PSCCH resource configuration associated with sidelink transmission mode 3, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

For each PSCCH resource configuration associated with sidelink transmission mode 4, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

3GPP TS 36.214 specifies some measurements for sidelink transmission in LTE/LTE-A as follows:

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH.<br>The reference point for the PSSCH-RSRP shall be the antenna connector of the UE.<br>If receiver diversity is in use by the UE, the reported value shall not be lower than the corresponding PSSCH-RSRP of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

5.1.30 Channel Busy Ratio (CBR)

| | |
|---|---|
| Definition | Channel busy ratio (CBR) measured in subframe n is defined as follows:<br>For PSSCH, the portion of sub-channels in the resource pool whose S-RSSI measured by the UE exceed a (pre-)configured threshold sensed over subframes [n − 100, n − 1];<br>For PSCCH, in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n − 100, n − 1], assuming that the PSCCH pool is composed of resources with a size of two consecutive PRB pairs in the frequency domain. |
| Applicable for | RRC_IDLE intra-frequency,<br>RRC_IDLE inter-frequency,<br>RRC_CONNECTED intra-frequency,<br>RRC_CONNECTED inter-frequency |

5.1.31 Channel Occupancy Ratio (CR)

| | |
|---|---|
| Definition | Channel occupancy ratio (CR) evaluated at subframe n is defined as the total number of sub-channels used for its transmissions in subframes [n − a, n − 1] and granted in subframes [n, n + b] divided by the total number of configured sub-channels in the transmission pool over [n − a, n + b]. |
| Applicable for | RRC_IDLE intra-frequency,<br>RRC_IDLE inter-frequency,<br>RRC_CONNECTED intra-frequency,<br>RRC_CONNECTED inter-frequency |

3GPP TS 36.212 specifies CRC attachment for downlink shared channel and downlink control information in LTE/LTE-A as shown below. The downlink shared channel and downlink control information are for communication between network node and UE, i.e. Uu link. The sidelink shared channel and sidelink control information are for communication between UEs, i.e. PC5 link or sidelink.

5.3.3.1.9A Format 5A

DCI format 5A is used for the scheduling of PSCCH, and also contains several SCI format 1 fields used for the scheduling of PSSCH.

The following information is transmitted by means of the DCI format 5A:

- Carrier indicator—3 bits. This field is present according to the definitions in [3].
- Lowest index of the subchannel allocation to the initial transmission—$\lceil \log_2(N_{subchannel}^{SL}) \rceil$ bits as defined in subclause 14.1.1.4C of [3].
- SCI format 1 fields according to 5.4.3.1.2:
  - Frequency resource location of initial transmission and retransmission.
  - Time gap between initial transmission and retransmission.
- SL index—2 bits as defined in subclause 14.2.1 of [3] (this field is present only for cases with TDD operation with uplink-downlink configuration 0-6).

[ . . . ]

5.4.3.1.2 SCI Format 1

SCI format 1 is used for the scheduling of PSSCH.

The following information is transmitted by means of the SCI format 1:

- Priority—3 bits as defined in subclause 4.4.5.1 of [7].
- Resource reservation—4 bits as defined in subclause 14.2.1 of [3].
- Frequency resource location of initial transmission and retransmission—$\lceil \log_2(N_{subchannel}^{SL}(N_{subchannel}^{SL}+1)/2) \rceil$ bits as defined in subclause 14.1.1.4C of [3].
- Time gap between initial transmission and retransmission—4 bits as defined in subclause 14.1.1.4C of [3].
- Modulation and coding scheme—5 bits as defined in subclause 14.2.1 of [3].
- Retransmission index—1 bit as defined in subclause 14.2.1 of [3].
- Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.
- Reserved information bits are added until the size of SCI format 1 is equal to 32 bits. The reserved bits are set to zero.

3GPP TS 36.211 specifies generation for physical sidelink shared channel and physical sidelink control channel in LTE/LTE-A as shown below. The physical sidelink shared channel and physical sidelink control channel are for communication between devices, i.e. PC5 link or device-to-device link. The physical sidelink shared channel (PSSCH) delivers data/transport block for sidelink shared channel (SL-SCH). The physical sidelink control channel (PSCCH) delivers sidelink control information (SCI).

9.1.1 Physical Channels

A sidelink physical channel corresponds to a set of resource elements carrying information originating from higher layers and is the interface defined between 3GPP TS 36.212 [3] and the present document 3GPP TS 36.211. The following sidelink physical channels are defined:

Physical Sidelink Shared Channel, PSSCH

Physical Sidelink Control Channel, PSCCH

3GPP RP-182111 specifies the Justification and objective of study item on NR V2X as follows:

3 Justification

SA1 has completed enhancement of 3GPP support for V2X services (eV2X services). The consolidated requirements for each use case group are captured in TR 22.886, and a set of the normative requirements is defined in TS 22.186.

SA1 has identified 25 use cases for advanced V2X services and they are categorized into four use case groups: vehicles platooning, extended sensors, advanced driving and remote driving. The detailed description of each use case group is provided as below.

- Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.
- Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.
- Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.
- Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

3GPP R1-1913680 states:

16 UE Procedures for Sidelink

A UE is provided by locationAndBandwidth-SL a BWP for SL transmissions (SL BWP) with numerology and resource grid determined as described in [4, TS38.211]. For a resource pool within the SL BWP, the UE is provided by numSubchannel a number of sub-channels where each sub-channel includes a number of contiguous RBs provided by subchannelsize. The first RB of the first sub-channel in the SL BWP is indicated by startRB-Subchannel. Available slots for a resource pool are provided by timeresourcepool and occur with a periodicity provided by 'periodResourcePool'. For an available slot without S-SS/PBCH blocks, SL transmissions can start from a first symbol indicated by startSL-symbols and be within a number of consecutive symbols indicated by lengthSLsymbols. For an available slot with S-SS/PSBCH blocks, the first symbol and the number of consecutive symbols is predetermined.

The UE expects to use a same numerology in the SL BWP and in an active UL BWP in a same carrier of a same cell. If the active UL BWP numerology is different than the SL BWP numerology, the SL BWP is deactivated.

A UE transmitting using a Mode-1 grant uses the corresponding fields in SCI to reserve the next resource(s) allocated by the same grant.

A priority of a PSSCH according to NR radio access or according to E-UTRA radio access is indicated by a priority field in a respective scheduling SCI format. A priority of a PSSS/SSSS/PSBCH according to E-UTRA radio access is provided by LTESidelinkSSBPriority. A priority of an S-SS/PBCH block is provided by NRSidelinkSSBPriority. A priority of a PSFCH is same as the priority of a corresponding PSSCH.

[ . . . ]

16.4 UE Procedure for Transmitting PSCCH

A UE can be provided a number of symbols in a resource pool, by timeResourcePSCCH, starting from a second symbol that is available for SL transmissions in a slot, and a number of PRBs in the resource pool, by frequencyResourcePSCCH, for a PSCCH transmission with a SCI format 0_1.

3GPP R1-1913643 states:

8 Physical Sidelink Shared Channel Related Procedures

A UE can be configured by higher layers with one or more sidelink resource pools. A sidelink resource pool can be for transmission of PSSCH, as described in Subclause 8.1, or for reception of PSSCH, as described in Subclause 8.3 and can be associated with either sidelink resource allocation mode 1 or sidelink resource allocation mode 2.

In the frequency domain, a sidelink resource pool consists of numSubchannel contiguous sub-channels. A sub-channel consists of subchannelsize contiguous PRBs, where numSubchannel and subchannelsize are higher layer parameters.

8.1 UE Procedure for Transmitting the Physical Sidelink Shared Channel

Each PSSCH transmission is associated with an PSCCH transmission.

That PSCCH transmission carries the $1^{st}$ stage of the SCI associated with the PSSCH transmission; the $2^{nd}$ stage of the associated SCI is carried within the resource of the PSSCH.

If the UE transmits SCI format 0-1 on PSCCH according to a PSCCH resource configuration in slot n and PSCCH resource m, then for the associated PSSCH transmission in the same slot

- one transport block is transmitted with up to two layers;
- The number of layers (u) is determined according to the "Number of DMRS port" field in the SCI
- The set of consecutive symbols within the slot for transmission of the PSSCH is determined according to subclause 8.1.2.1;
- The set of contiguous resource blocks for transmission of the PSSCH is determined according to subclause 8.1.2.2;

[ . . . ]

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:

The UE shall not transmit PSSCH in symbols which are not configured for sidelink. A symbol is configured for sidelink, according to higher layer parameters startSL-symbols and lengthSLsymbols, where startSLsymbols is the symbol index of the first symbol of lengthSLs-ymbols consecutive symbols configured for sidelink.

Within the slot, PSSCH resource allocation starts at symbol startSLsymbols+1.

The UE shall not transmit PSSCH in symbols which are configured for use by PSFCH, if PSFCH is configured in this slot.

The UE shall not transmit PSSCH in the last symbol configured for sidelink.

The UE shall not transmit PSSCH in the symbol immediately preceding the symbols which are configured for use by PSFCH, if PSFCH is configured in this slot.

[ . . . ]

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.

[ . . . ]

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;

L1 priority, $prio_{TX}$;

the remaining packet delay budget;

the number of sub-channels to be used for the PSSCH/PSCCH transmission in a slot, $L_{subCH}$;

optionally, the resource reservation interval, $P_{rsvp\_TX}$, in units of ms.

The following higher layer parameters affect this procedure:

t2 min_SelectionWindow: internal parameter $T_{2\ min}$ is set to the corresponding value from higher layer parameter t2 min_SelectionWindow for the given value of $prio_{TX}$.

SL-ThresRSRP_pi_pj: this higher layer parameter provides an RSRP threshold for each combination $(p_i, p_j)$, where $p_i$ is the value of the priority field in a received SCI format 0-1 and $p_j$ is the priority of the transmission of the UE selecting resources; for a given invocation of this procedure, $p_j = prio_{TX}$.

RSforSensing selects if the UE uses the PSSCH-RSRP or PSCCH-RSRP measurement, as defined in subclause 8.4.2.1.

reservationPeriodAllowed t0_SensingWindow: internal parameter $T_0$ is defined as the number of slots corresponding to t0_SensingWindow ms.

The resource reservation interval, $P_{rsvp\_TX}$, if provided, is converted from units of ms to units of logical slots, resulting in $P'_{rsvp\_TX}$.

Notation:

$(t_0^{SL}, t_1^{SL}, t_2^{SL}, \ldots)$ denotes the set of slots which can belong to a sidelink resource pool and is defined in [TBD].

The following steps are used:

1) A candidate single-slot resource for transmission $R_{x,y}$, is defined as a set of $L_{subCH}$ contiguous sub-channels with sub-channel x+j in slot $t_y^{SL}$ where j=0, . . . , $L_{subCH}-1$. The UE shall assume that any set of $L_{subCH}$ contiguous sub-channels included in the corresponding resource pool within the time interval $[n+T_1, n+T_2]$ correspond to one candidate single-slot resource, where selection of $T_1$ is up to UE implementation under $0 \le T_1 \le T_{proc,1}$, where $T_{proc,1}$ is TBD;

If $T_{2\ min}$ is shorter than the remaining packet delay budget (in slots) then $T_2$ is up to UE implementation subject to $T_{2\ min} \le T_2 \le$ remaining packet budget (in slots); otherwise $T_2$ is set to the remaining packet delay budget (in slots).

The total number of candidate single-slot resources is denoted by $M_{total}$.

2) The sensing window is defined by the range of slots $[n-T_0, n-T_{proc,0})$ where $T_0$ is defined above and $T_{proc,1}$ is TBD. The UE shall monitor slots which can belong to a sidelink resource pool within the sensing window except for those in which its own transmissions occur. The UE shall perform the behaviour in the following steps based on PSCCH decoded and RSRP measured in these slots.

3) The internal parameter $Th(p_i)$ is set to the corresponding value from higher layer parameter SL-ThresRSRP_pi_pj for $p_j$ equal to the given value of $prio_{TX}$ and each priority value $p_i$.

4) The set $S_A$ is initialized to the set of all the candidate single-slot resources.

5) The UE shall exclude any candidate single-slot resource $R_{x,y}$ from the set $S_A$ if it meets all the following conditions:

the UE has not monitored slot $t_m^{SL}$ in Step 2.

for any periodicity value allowed by the higher layer parameter reservationPeriodAllowed and a hypothetical SCI format 0-1 received in slot $t_m^{SL}$ with "Resource reservation period" field set to that periodicity value and indicating all subchannels of the resource pool in this slot, condition c in step 6 would be met.

6) The UE shall exclude any candidate single-slot resource $R_{x,y}$ from the set $S_A$ if it meets all the following conditions:

a. the UE receives an SCI format 0-1 in slot $t_m^{SL}$, and "Resource reservation period" field, if present, and "Priority" field in the received SCI format 0-1 indicate the values $P_{rsvp\_RX}$ and $prio_{RX}$, respectively according to Subclause [TBD] in [6, TS 38.213];

b. the RSRP measurement performed, according to subclause 8.4.2.1 for the received SCI format 0-1, is higher than $Th(prio_{RX})$;

c. the SCI format received in slot $t_m^{SL}$ or the same SCI format which, if and only if the "Resource reservation period" field is present in the received SCI format 0-1, is assumed to be received in slot(s) $t_{m+q\times P'r_{svp\_RX}}^{SL}$ determines according to subclause [TBD] in [6, TS 38.213] the set of resource blocks and slots which overlaps with $R_{x,y+j\times P'r_{svp\_RX}}^{SL}$ for q=1, 2, . . . , Q and j=0, 1, . . . , $C_{resel}-1$. Here, $P'_{rsvp\_RX}$ is $P_{rsvp\_RX}$ converted to units of logical slots, $$Q = \left\lceil \frac{T_{scal}}{P_{rsvp\_RX}} \right\rceil \text{ if } P_{rsvp\_RX} < T_{scal}$$

and $n'-m \le P'_{rsvp\_RX}$ where $t_{n'}^{SL}=n$ if slot n belongs to the set $(t_0^{SL}, t_1^{SL}, \ldots, t_{T_{max}}^{SL})$, otherwise slot $t_{n'}^{SL}$ is the first slot after slot n belonging to the set $(t_0^{SL}, t_1^{SL}, \ldots, t_{T_{max}}^{SL})$; otherwise Q=1. $T_{scal}$ is FFS.

7) If the number of candidate single-slot resources remaining in the set $S_A$ is smaller than $0.2 \cdot M_{total}$, then $Th(p_i)$ is increased by 3 dB for each priority value $Th(p_i)$ and the procedure continues with step 4.

The UE shall report set $S_A$ to higher layers.

8.1.5 UE Procedure for Determining Slots and Resource Blocks for PSSCH transmission associated with an SCI format 0-1

The set of slots and resource blocks for PSSCH transmission is determined by the resource used for the PSCCH transmission containing the associated SCI format 0-1, and fields "Frequency resource assignment", "Time resource assignment" of the associated SCI format 1 as described below.

[ . . . ]

For sidelink resource allocation mode 1, a UE upon detection of SCI format 0-1 on PSCCH can decode PSSCH according to the detected SCI format 0-2, and associated PSSCH resource configuration configured by higher layers.

For sidelink resource allocation mode 2, a UE upon detection of SCI format 0-1 on PSCCH can decode PSSCH according to the detected SCI format 0-2, and associated PSSCH resource configuration configured by higher layers.

3GPP R1-1913601 states:

[ . . . ]

Agreements:

- NR V2X supports an initial transmission of a TB without reservation, based on sensing and resource selection procedure
- NR V2X supports reservation of a sidelink resource for an initial transmission of a TB at least by an SCI associated with a different TB, based on sensing and resource selection procedure
  - This functionality can be enabled/disabled by (pre-) configuration
- FFS Standalone PSCCH transmissions for resource reservations are supported in NR V2X

[ . . . ]

Agreements:

- NR V2X Mode-2 supports resource reservation for feedback-based PSSCH retransmissions by signaling associated with a prior transmission of the same TB
  - FFS impact on subsequent sensing and resource selection procedures
  - At least from the transmitter perspective of this TB, usage of HARQ feedback for release of unused resource(s) is supported
    - No additional signaling is defined for the purpose of release of unused resources by the transmitting UE
    - FFS the behavior of the receiver UE(s) of this TB and other UEs

[ . . . ]

Agreements:

- RAN1 to further select between the following options of sidelink resource reservation for blind retransmissions:
  - Option 1: A transmission can reserve resources for none, one, or more than one blind retransmission
  - Option 2: A transmission can reserve resource for none or one blind retransmission Agreements:

- Resource selection window is defined as a time interval where a UE selects sidelink resources for transmission
  - The resource selection window starts T1≥0 after a resource (re-)selection trigger and is bounded by at least a remaining packet delay budget
  - FFS T1 value, whether it is measured in slots, symbols, ms, etc.
  - FFS other conditions Agreements:

- Support a sub-channel as the minimum granularity in frequency domain for the sensing for PSSCH resource selection
  - No additional sensing for other channels

[ . . . ]

Agreements:

- At least for mode 2, The maximum number of SL resources $N_{MAX}$ reserved by one transmission including current transmission is [2 or 3 or 4]
  - Aim to select the particular number in RAN1 #98
- $N_{MAX}$ is the same regardless of whether HARQ feedback is enabled or disabled Agreements:

- At least for mode 2, (Pre-)configuration can limit the maximum number of HARQ (re-) transmissions of a TB
  - Up to 32
  - FFS the set of values
  - FFS signaling details (UE-specific, resource pool specific, QoS specific, etc.)
  - If no (pre)configuration, the maximum number is not specified
  - Note: this (pre-)configuration information is NOT intended for the Rx UE Agreements:

- In Mode-2, SCI payload indicates sub-channel(s) and slot(s) used by a UE and/or reserved by a UE for PSSCH (re-)transmission(s)
- SL minimum resource allocation unit is a slot
- FFS whether when the resource allocation is multiple slots, the slots can be aggregated
- FFS whether in case of multiple slots, the indicated slots are contiguous or not Working Assumption:

- An indication of a priority of a sidelink transmission is carried by SCI payload
  - This indication is used for sensing and resource (re) selection procedures
  - This priority is not necessarily the higher layer priority Agreements:

The resource (re-)selection procedure includes the following steps

Step 1: Identification of candidate resources within the resource selection window FFS details Step 2: Resource selection for (re-)transmission(s) from the identified candidate resources FFS details Agreements:

In Step 1 of the resource (re-)selection procedure, a resource is not considered as a candidate resource if:

The resource is indicated in a received SCI and the associated L1 SL-RSRP measurement is above an SL-RSRP threshold The SL-RSRP threshold is at least a function of the priority of the SL transmission indicated in the received SCI and the priority of the transmission for which resources are being selected by the UE FFS details

[ . . . ]

Agreements:

Maximum number of HARQ (re-)transmissions is (pre-) configured per priority per CBR range per transmission resource pool The priority is the one signaled in SCI This includes both blind and feedback-based HARQ (re)-transmission The value range is any value from 1 to 32

If the HARQ (re)transmissions for a TB can have a mixed blind and feedback-based approached (FFS whether or not to support this case), the counter applies to the combined total Agreements:

Resource (re-)selection procedure supports re-evaluation of Step 1 and Step 2 before transmission of SCI with reservation The re-evaluation of the (re-)selection procedure for a resource reservation signalled in a moment 'm' is not required to be triggered at moment>'m−T3' (i.e. resource reselection processing time needs to be ensured)

FFS condition to change resource(s) from previous iteration to resource(s) from current iteration FFS relationship of T1 and T3, if any FFS whether to handle it differently for blind and feedback-based retransmission resources Agreements:

In Step 1, initial L1 SL-RSRP threshold for each combination of $p_i$ and $p_j$ is (pre-) configured, where $p_i$—priority indication associated with the resource indicated in SCI and $p_j$—priority of the transmission in the UE selecting resources Agreements:

In Step 1, when the ratio of identified candidate resources to the total number of resources in a resource selection window, is less than X %, all configured thresholds are increased by Y dB and the resource identification procedure is repeated FFS value(s)/configurability of X At least one value of X=20

Y=3

FFS other conditions to stop RSRP threshold increment, if any

[ . . . ]

Agreements:

Support at least an initial transmission and reservation of the resource(s) for retransmission(s) to have the same number of sub-channels

[ . . . ]

Agreements:

When reservation of a sidelink resource for an initial transmission of a TB at least by an SCI associated with a different TB is disabled, $N_{MAX}$ is 3

SCI signaling is designed to allow to indicate 1 or 2 or 3 resources at least of the same number of sub-channels with full flexibility in time and frequency position in a window W of a resource pool FFS: if full flexibility is limited in some cases Value 2 or 3 is (pre-)configured per resource pool FFS size of window W When reservation of a sidelink resource for an initial transmission of a TB at least by an SCI associated with a different TB is enabled, select in RAN1 #99 from the following:

Option 1-a. A period>W is additionally signaled in SCI and the same reservation is applied with respect to resources indicated within $N_{MAX}$ within window W at subsequent periods FFS number of subsequent reservation periods FFS $N_{MAX}$ is always same regardless if a period>W is additionally signaled or not for SCI size perspective.

Option 1-b. A time gap>W is additionally signaled in SCI and the same reservation is applied with respect to resources indicated within $N_{MAX}$ within window W at resources indicated by the time gap FFS $N_{MAX}$ is always same regardless if a time gap>W is additionally signaled or not for SCI size perspective.

Option 2. There is no additional field (NDI and HARQ ID are used at the moment of SCI reception) to distinguish reservation for another TB, and at least one of $N_{MAX}$ resources can be signaled beyond window W

[ . . . ]

Agreements:

For a given time instance n when resource (re-)selection and re-evaluation procedure is triggered The resource selection window starts at time instance (n+T1), T1≥0 and ends at time instance (n+T2)

The start of selection window T1 is up to UE implementation subject to $T1 \le T_{proc,1}$ T2 is up to UE implementation with the following details as a working assumption:

$T2 \ge T2_{min}$

If $T2_{min}$>Remaining PDB, then $T2_{min}$ is modified to be equal to Remaining PDB FFS other details of $T2_{min}$ including whether the minimum window duration $T2_{min}-T1$ is a function of priority UE selection of T2 shall fulfil the latency requirement, i.e. T2 Remaining PDB A sensing window is defined by time interval [n−T0, n−$T_{proc,0}$)

T0 is (pre-)configured, $T0>T_{proc,0}$ FFS further details

FFS, if $T_{proc,0}$ and $T_{proc,1}$ are defined separately or as a sum

FFS relation of T3, $T_{proc,0}$, $T_{proc,1}$

Time instances n, T0, T1, T2, $T2_{min}$ are measured in slots, FFS $T_{proc,0}$ and $T_{proc,1}$ A UE is expected to select resources for all intended (re-)transmissions within the PDB, i.e. the number of intended (re-)transmissions is an input to the resource (re-)selection procedure

[ . . . ]

Agreements:

Support W to be equal to 32 slots

Agreements:

The first proposal under Wed. session in R1-1913450 is agreed, with one clarification that S is the number of sub-channels in the resource pool

---

First proposal under Wed. session in R1-193450:

For mode 1 and mode 2, for the time-frequency resource indication in the SCI:

$N_{MAX}=2$

Frequency $\sum_{m=1}^{s}(S+1-m)=\frac{S(S+1)}{2}$ code-points, indicating starting sub-channel of the second resource and number of sub-channels of both resources $\left\lceil \log_2\left(\frac{S(S+1)}{2}\right)\right\rceil$ bit Time 1 code-point indicates no reserved resource 31 code-points indicate different time position of the second resource within 32 slots 5 bit $N_{MAX}=3$ Frequency Option 2-f-a: joint coding $\sum_{m=1}^{s}(S+1-m)^2=\frac{S(S+1)(2S+1)}{6}$ code-points indicating starting sub-channel of the second resource, starting sub-channel of the third resource, and the number of sub-channels of all resources $\left\lceil \log_2\left(\frac{S(S+1)(2S+1)}{6}\right)\right\rceil$ bit Time Option 2-t-a: joint coding 1 code-point indicates no reserved resource 31 code-points indicate different time position of the second resource within 32 slots, when no third resource is reserved 30 + 29 + . . . + 1 = 465 code-points indicate different time position of two resources within 32 slots 9 bit

---

Agreements:

On a per resource pool basis, when reservation of a sidelink resource for an initial transmission of a TB at least by an SCI associated with a different TB is enabled:

A period is additionally signalled in SCI and the same reservation is applied with respect to resources indicated within $N_{MAX}$ within window W at subsequent periods A set of possible period values is the following: 0, [1:99], 100, 200, 300, 400, 500, 600, 700, 800, 900, 1000 ms <=4 bits are used in SCI to indicate a period An actual set of values is (pre-)configured Regarding the number of periods The number of remaining periodic reservations is not explicitly indicated in SCI (working assumption) Procedure of mapping of periodic semi-persistent resources into the resource selection window is reused from LTE By reusing TS 36.213, section 14.1.1.6, steps 5 and 6 of non-partial sensing, as applicable (working assumption) Procedure of triggering periodic semi-persistent resources reselection based on reselection counter and keep probability is reused from LTE By reusing definition and procedure of $C_{resel}$ defined in TS 36.213, as applicable Send an LS to RAN2 asking them to implement accordingly for TS38.321 based on TS36.321, R1-1913458—Sergey (Intel)

Procedure of using sidelink RSSI for ranking of resources is not applied

Agreements:

$T2_{min}$, is (pre-)configured per priority indicated in SCI from the following set of values:

{1, 5, 10, 20}*$2^{\mu}$, where μ=0, 1, 2, 3 for SCS 15, 30, 60, 120 respectively Agreements:

In Step 2, randomized resource selection from the identified candidate resources in the selection window is supported FFS if CSI can be used for resources selection Agreements:

T0 is (pre)-configured between: 1000+[100] ms and [100] ms

Agreements:

Support (pre)-configuration per resource pool between:

L1 SL-RSRP measured on DMRS of PSSCH after decoding of associated 1st stage SCI, or L1 SL-RSRP measured on DMRS of PSCCH for 1st SCI after decoding of associated 1st stage SCI Note: L1 SL-RSRP is measured only based on one of the above, but not both 3GPP R1-1913642 states:

8.3 Sidelink Control Information on PSCCH

SCI carried on PSCCH is a 1st-stage SCI, which transports sidelink scheduling information.

8.3.1 1st-Stage SCI Formats

The fields defined in each of the 1st-stage SCI formats below are mapped to the information bits $a_0$ to $a_{A-1}$ as follows:

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

8.3.1.1 SCI Format 0-1

SCI format 0-1 is used for the scheduling of PSSCH and 2nd-stage-SCI on PSSCH

The following information is transmitted by means of the SCI format 0-1:

Priority—3 bits

Frequency resource assignment $$\left\lceil \log_2\left(\frac{N_{subChannel}^{SL}(N_{subChannel}^{SL}+1)}{2}\right)\right\rceil$$

bits when the value of the higher layer parameter maxNumResource is configured to 2; otherwise $$\left\lceil \log_2\left(\frac{N_{subChannel}^{SL}(N_{subChannel}^{SL}+1)(2N_{subChannel}^{SL}+1)}{6}\right)\right\rceil$$

bits when the value of the higher layer parameter maxNumResource is configured to 3

Time resource assignment—5 bits when the value of the higher layer parameter maxNumResource is configured to 2; otherwise 9 bits when the value of the higher layer parameter maxNumResource is configured to 3

Resource reservation period—$\lceil \log_2(N_{reservPeriod}) \rceil$ bits, if higher parameter reserveResourceDifferentTB is configured; 0 bit otherwise.

DMRS pattern—[x] bits, if more than one DMRS patterns are configured by higher layer parameter TimePatternPsschDmrs; 0 bit otherwise.

$2^{nd}$-stage SCI format—[x] bits.

Beta_offset indicator—[2] bits.

Number of DMRS port—1 bit.

Modulation and coding scheme—5 bits.

Reserved—[2-4] bits as determined by higher layer parameter [XXX], with value set to zero.

8.4.1 $2^{nd}$-Stage SCI Formats

The fields defined in each of the $2^{nd}$-stage SCI formats below are mapped to the information bits $a_0$ to $a_{A-1}$ as follows:

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

8.4.1.1 SCI Format 0-2

SCI format 0-2 is used for the decoding of PSSCH.

The following information is transmitted by means of the SCI format 0-2:

HARQ Process ID—[x] bits.

New data indicator—1 bit.

Redundancy version—2 bits.

Source ID—8 bits.

Destination ID—16 bits.

CSI request—1 bit.

If the $2^{nd}$-stage SCI format field in the corresponding SCI format 0-1 indicates type 1 groupcast as defined in subclause x.x.x of [6, TS 38.214], the following fields are present:

Zone ID—[x] bits.

Communication range requirement—[4] bits

The Running CR to TS 38.331 for 5G V2X with NR sidelink_v11 (by Huawei) states:

SL-ResourcePool

The IE SL-ResourcePool specifies the configuration information for NR sidelink communication resource pool.

SL-ResourcePool information element

```
-- ASN1START
-- TAG-SL-RESOURCEPOOL-START
SL-ResourcePool-r16 ::=                         SEQUENCE {
    sl-PSCCH-Config-r16                           SetupRelease { SL-PSCCH-Config-r16 }
OPTIONAL, -- Need M
    sl-PSSCH-Config-r16                           SetupRelease { SL-PSSCH-Config-r16 }
OPTIONAL, -- Need M
    sl-PSFCH-Config-r16                           SetupRelease { SL-PSFCH-Config-r16 }
OPTIONAL, -- Need M
    sl-SyncAllowed-r16                            SL-SyncAllowed-r16
OPTIONAL, -- Need M
    sl-SubchannelSize-r16                         ENUMERATED5 {n10, n15, n20, n25, n50, n75,
n100}                    OPTIONAL, -- Need M
    sl-Period-r16                                 ENUMERATED {ffs}
OPTIONAL, -- Need M
    sl-TimeResource-r16                           ENUMERATED{ffs}
OPTIONAL, -- Need M
    sl-StartRB-Subchannel-r16                     INTEGER (0..265)
OPTIONAL, -- Need M
    sl-NumSubchannel-r16                          INTEGER (1..27)
OPTIONAL, -- Need M
    sl-MCS-Table-r16                              ENUMERATED {qam64, qam256, qam64LowSE}
OPTIONAL, -- Need M
    sl-ThreshS-RSSI-CBR-r16                       INTEGER (0..45)
OPTIONAL, -- Need M
    sl-TimeWindowSizeCBR-r16                      ENUMERATED {ms100, slot100}
OPTIONAL, -- Need M
    sl-TimeWindowSizeCR-r16                       ENUMERATED {ms1000, slot1000}
OPTIONAL, -- Need M
    sl-PTRS-Config-r16                            SL-PTRS-Config-r16
OPTIONAL, -- Need M
    sl-ConfiguredGrantConfigList-r16              SL-ConfiguredGrantConfigList-r16
OPTIONAL, -- Need M
    sl-UE-SelectedConfigRP-r16                    SL-UE-SelectedConfigRP-r16
OPTIONAL, -- Need M
    sl-RxParametersNcell-r16                      SEQUENCE {
      sl-TDD-Config-r16                             TDD-UL-DL-ConfigCommon
OPTIONAL,
      sl-SyncConfigIndex-r16                          INTEGER (0..15)
    }
```

-continued

SL-ResourcePool information element

```
OPTIONAL, -- Need M
    ...
}
SL-SyncAllowed-r16 ::=              SEQUENCE {
    gnss-Sync-r16                       ENUMERATED {true}
OPTIONAL, -- Need R
    gnbEnb-Sync-r16                     ENUMERATED {true}
OPTIONAL, -- Need R
    ue-Sync-r16                         ENUMERATED {true}
OPTIONAL -- Need R
}
SL-PSCCH-Config-r16 ::=             SEQUENCE {
  sl-TimeResourcePSCCH-r16              ENUMERATED {n2, n3}
OPTIONAL, -- Need M
  sl-FreqResourcePSCCH-r16              ENUMERATED {n10, n12, n15, n20, n25}
OPTIONAL, -- Need M
  sl-DMRS-ScreambleID-r16               INTEGER (0..65535)
OPTIONAL, -- Need M
  sl-NumReservedBits-r16                INTEGER (2..4)
OPTIONAL, -- Need M
  ...
}
SL-PSSCH-Config-r16 ::=             SEQUENCE {
  sl-PSSCH-DMRS-TimePattern-r16         ENUMERATED {ffs}
OPTIONAL, -- Need M
  sl-BetaOffsets2ndSCI-r16              SEQUENCE (SIZE (4)) OF SL-BetaOffsets-r16
OPTIONAL, -- Need M
  sl-Scaling-r16                        ENUMERATED {f0p5, f0p65, f0p8, f1}
OPTIONAL, -- Need M
  ...
}
SL-PSFCH-Config-r16 ::=             SEQUENCE {
  sl-PSFCH-Period-r16                   ENUMERATED {s10, s11, s12, s14}
OPTIONAL, -- Need M
  sl-PSFCH-RB-Set-r16                   BIT STRING (SIZE (275))
OPTIONAL, -- Need M
  sl-NumMuxCS-Pair-r16                  ENUMERATED {n1, n2, n3, n4, n6}
OPTIONAL, -- Need M
  sl-MinTimeGapPSFCH-r16                ENUMERATED {s12, s13}
OPTIONAL, -- Need M
  sl-PSFCH-HopID-r16                    INTEGER (0..1023)
OPTIONAL, -- Need M
  ...
}
SL-PTRS-Config-r16 ::=              SEQUENCE {
    sl-PTRS-FreqDensity-r16             SEQUENCE (SIZE (2)) OF INTEGER (1..276)
OPTIONAL, -- Need M
    sl-PTRS-TimeDensity-r16             SEQUENCE (SIZE (3)) OF INTEGER (0..29)
OPTIONAL, -- Need M
    sl-PTRS-RE-Offset-r16               ENUMERATED {offset01, offset10, offset11}
OPTIONAL, -- Need M
    ...
}
SL-UE-SelectedConfigRP-r16 ::=      SEQUENCE {
    sl-CBR-Priority-TxConfigList-r16    SL-CBR-Priority-TxConfigList-r16
OPTIONAL, -- Need M
    sl-ThresPSSCH-RSRP-List-r16         SL-ThresPSSCH-RSRP-List-r16
OPTIONAL, -- Need M
    sl-MultiReserveResource-r16         ENUMERATED {enabled}
OPTIONAL, -- Need M
    sl-MaxNumPerReserve-r16             ENUMERATED {n2, n3}
OPTIONAL, -- Need M
    sl-SensingWindow-r16                ENUMERATED {ms100, ms1100}
OPTIONAL, -- Need M
    sl-SelectionWindow-r16              ENUMERATED {n1, n5, n10, n20}
OPTIONAL, -- Need M
    sl-ResourceReservePeriodList-r16    SEQUENCE (SIZE (1..16)) OF SL-
ResourceReservePeriod-r16    OPTIONAL, -- Need M
    sl-RS-ForSensing-r16                ENUMERATED {pscch, pssch},
    ...
}
SL-ResourceReservePeriod-r16 ::=        ENUMERATED {s0, s100, s200, s300, s400, s500, s600,
s700, s800, s900, s1000}
SL-BetaOffsets-r16                  INTEGER (0..31)
-- TAG-SL-RESOURCEPOOL-STOP
-- ASN1STOP
```

| SL-ResourcePool field descriptions |
| --- |
| sl-NumSubchannel<br>Indicates the number of subchannels in the corresponding resource pool, which consists of contiguous PRBs only.<br>sl-Period<br>Indicates the period of repeating sl-TimeResource.<br>sl-StartRB-Subchannel<br>Indicates the lowest RB index of the subchannel with the lowest index in the resource pool.<br>sl-SubchannelSize<br>Indicates the minimum granularity in frequency domain for the sensing for PSSCH resource selection in the unit of PRB.<br>sl-TimeResource<br>Indicates the time resource of resource pool within sl-Period. |

| SL-PSCCH field descriptions |
| --- |
| sl-FreqResourcePSCCH<br>Indicates the number of PRBs for PSCCH in a resource pool where it is not greater than the number PRBs of the subchannel.<br>sl-TimeResourcePSCCH<br>Indicates the number of symbols of PSCCH in a resource pool. |

| SL-PSFCH field descriptions |
| --- |
| sl-PSFCH-Period<br>Indicates the period of PSFCH resource in the unit of slots within this resource pool. If set to 0, no resource for PSFCH, and HARQ feedback for<br>all transmissions in the resource pool is disabled.<br>sl-PSFCH-RB-Set<br>Indicates whether CSI reporting is enabled in sidelink unicast. If this field is absent, sidelink CSI reporting is disabled. |

| SL-UE-SelectedConfigRP field descriptions |
| --- |
| sl-MaxNumPerReserve<br>Indicates the maximum number of reserved PSCCH/PSSCH resources that can be indicated by an SCI.<br>sl-MultiReserveResource<br>Indicates if it is allowed to reserve a sidelink resource for an initial transmission of a TB by an SCI associated with a different TB, based on sensing and resource selection procedure.<br>sl-ResourceReservePeriod<br>Set of possible resource reservation period allowed in the resource pool. Up to 16 values can be configured per resource pool.<br>sl-RS-ForSensing<br>Indicates whether DMRS of PSCCH or PSSCH is used for L1 RSRP measurement in the sensing operation.<br>sl-SensingWindow<br>Parameter that indicates the start of the sensing window.<br>sl-SelectionWindow<br>Parameter that determines the end of the selection window in the resource selection for a TB with respect to priority indicated in SCI.<br>sl-ThresPSSCH-RSRP-List<br>Indicates a list of 64 thresholds, and the threshold should be selected based<br>on the priority in the decoded SCI and the priority in the SCI to be transmitted. A resource is excluded if it is indicated or reserved by a decoded SCI and PSSCH RSRP in the associated data resource is above a threshold. |

The Draft Report of 3GPP TSG RAN WG1 #100-e v0.1.1 states:

Agreements:

Time resource assignment in SCI uses an extended time domain RIV mechanism as follows:

```
if N = 1
  TRIV = 0
elseif N = 2
  TRIV = T1
else
  if (T2 − T1 − 1) ≤ 15
      TRIV = 30(T2 − T1 − 1) + T1 + 31
  Else
    TRIV = 30(31 − T2 + T1) + 62 − T1
  end if
end if
```

where

N denotes the actual number of resources indicated

Ti denotes i-th resource time offset for N=2, $1 \leq T_1 \leq 31$ for N=3, $1 \leq T_1 \leq 30$, $T_1 < T_2 \leq 31$ Agreements:

For frequency resource indication, the following resource index calculation is used For Nmax=2, $r = f_2 + \sum_{i=1}^{m-1} (N_{subchannel}^{SL} + 1 - i)$ For Nmax=3, $r = f_2 + f_3 \cdot (N_{subchannel}^{SL} + 1 - m) + \sum_{i=1}^{m-1} (N_{subchannel}^{SL} + 1 - i)^2$ where $f_2$ denotes lowest sub-channel index for the second resource, if any $f_3$ denotes lowest sub-channel index for the third resource, if any m denotes number of sub-channels in a frequency resource allocation If time domain allocation indicates N<Nmax, the decoded lowest sub-channel indexes corresponding to Nmax minus N last resources are not used Agreements:

On a per resource pool basis, when reservation of a sidelink resource for an initial transmission of a TB at least by an SCI associated with a different TB is enabled:

A set of possible period values additionally includes all integer values from 1 to 99 ms 3GPP R1-2000566 states:

| Proposal 1: the values for T3, $T_{proc,0}$, $T_{proc,1}$ are as follows: | | | |
| --- | --- | --- | --- |
| SCS, kHz | $T_{proc,0}$, slots | $T_{proc,1}$, slots | T3, slots |
| 15 | 1 | 1 | 2 |
| 30 | 1 | 1 | 2 |
| 60 | 2 | 2 | 4 |
| 120 | 2 | 3 | 5 |

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

Cell: A cell is composed of one or multiple associated TRPs, i.e. coverage of the cell is composed of coverage of all associated TRP(s). One cell is controlled by one BS. Cell could also be referred to as TRP group (TRPG).

NR-PDCCH: A channel carries downlink control signal which is used to control communication between a UE and a network side. A network transmits NR-PDCCH on configured control resource set (CORESET) to the UE.

One or multiple of following assumptions for network side may be used hereafter:

Downlink timing of TRPs in the same cell are synchronized.

RRC layer of network side is in BS.

One or multiple of following assumptions for UE side may be used hereafter:

There are at least two UE (RRC) states: connected state (or called active state) and non-connected state (or called inactive state or idle state). Inactive state may be an additional state or belong to connected state or non-connected state.

In NR Rel-16, resource reservation for another TB by a SCI could be (pre-) configured with enabled or not enabled or not configured in a sidelink resource pool. In RAN1 #99 meeting, it is agreed that when a sidelink resource pool is configured with enabled such reservation, the sidelink resource pool is configured with a set of (reservation) period value. Possible (reservation) period could be 100 ms, 200 ms, 300 ms, . . . , 1000 ms, and 0 ms. Resource reservation period field in a SCI in the sidelink resource pool could indicate which period value for (future) resource reservation. The size of the set of period value could be from 1 to 16.

Based on the current 3GPP TS 38.212 specification, the bit-size of the resource reservation period field could be $\lceil \log_2(N_{reservPeriod}) \rceil$ bits. The $N_{reservPeriod}$ may mean the size of the set of period value, e.g. the entry number of the set of period value or cardinality of the set of period value. In addition, in order to meet latency requirement of some services, RAN1 #100e meeting has agreed to support short (reservation) period 1 ms, 2 ms, 3 ms, . . . 99 ms (e.g., less than 100 ms and larger than 0 ms). When a device is triggered for resource (re-)identification and/or resource (re-)selection, the device identifies a set of resource and/or select one or more resource(s) among the set. The one or more resource(s) are used for same TB or different TB transmission. In other words, different TB transmission may imply the device would indicate resource(s) for different TB via resource reservation period field in a SCI.

When the other device receives the SCI from the device, the other device may exclude the one or more resource(s) indicated or reserved by the SCI in its selection window. The selection window size is T2−T1 and/or value of T1 is 0≤T1≤Tproc,1 or Tproc,1≤T1≤4 and/or value of T2 is 20≤T2≤100. For reserved period larger than or equal to 100 ms, it may be fine for the other device to exclude the device's reserved resource since there is at most one resource reserved by the device in other device's selection window. For possible reserved period smaller than 100 ms (e.g., 1~99 ms), one possible way is assuming there is more than one reserved resource (spanning) in the selection window. In other words, the other device may perform scaling number of excluding resource from the SCI (if the SCI indicates the reserved period is 1~99 ms). For example, for SCI indicating reserved period with value 20 ms, other device may exclude 100/20=5 (periodic) resource(s) for generating the set. However, for some reserved period (especially 1~9 ms), it may cause dense resource exclusion which may be hard for the other device to select a resource for sidelink transmission. When the set is not generated in one iteration, increasing RSRP threshold (which is a relaxed threshold) for additional iteration could allow more candidate resources in the set for selection. Consequently, the resources in the set or the selected resource from the set may cause or have interference in that resource. Hence, for SCI indicating some reserved period (especially 1~9 ms), how to perform resource (re-) identification and/or resource exclusion and/or resource (re-)selection may need to be solved.

First Concept

One general concept of the invention is that, for each period value in a first set of reserved period, a different resource exclusion and/or resource (re-)selection scheme is performed than the period value in a second set of reserved period. Different resource exclusion and/or resource (re-) selection scheme could be different number of exclusion resource and/or different position of exclusion resource and/or different number of resource (re-)selection. Different resource exclusion scheme could be the position of resource is associated with different (measured or derived) RSRP threshold (among resource(s) reserved by a SCI). For the first set of reserved period, amount of number of resources which may be excluded is derived based on a first number. For the second set of reserved period, amount of number of resources which may be excluded is derived based on a second number. The first number could different from the second number. In one embodiment, the second number could be 0 or 1. The first number could be larger than 1. Alternatively, the second number could be larger than 1. The first number could be larger than 1.

Method a

The first number could be derived from Tscal_1 which is different from Tscal_2 for deriving the second number. In one embodiment, for each period value in the first set of reserved period, the first number could be derived from Tscal_1. The first number may be derived based on Tscal_1 and associated reserved period value, e.g. ceiling value or floor value of Tscal_1/associated reserved period value. For each period value in the second set of reserved period, the second number could be derived from Tscal_2. The second number may be derived based on Tscal_2 and associated reserved period value, e.g. ceiling value or floor value of Tscal_2/associated reserved period value.

More specifically, scaling time duration (e.g. Tscal) may be determined based on associated reserved period value. In one embodiment, the second number may be an upper bound of the first number. The first number may have a lower bound value of a third number. The first number could be min(ceil(Tscal_1/period in the first set of reserved period), a third number) or max(ceil(Tscal_1/period in the first set of reserved period), a third number). The first number could also be min(floor(Tscal_1/period in the first set of reserved period), a third number) or max(floor(Tscal_1/period in the first set of reserved period), a third number).

In one embodiment, Tscal_1 could be used for deriving the first number. Tscal_2 could be used for deriving the second number. Tscal_2 could be 100 ms. Tscal_2 could be specified in standard or (pre-)configured by higher layer signaling. Tscal_2 could also be (pre-) configured associated to the sidelink resource pool, or indicated by resource reservation period field in SCI.

Each or one codepoint of the resource reservation period field could be associated with one entry of a list of reserved period. Each or one entry of the list of reserved period may indicate a reserved period (e.g., 0, 1~99, 100:100:1000 ms) and/or the first number for the reserved period. In one embodiment, the first number for different reserved periods could be the same of different. The scaling time duration (e.g. Tscal_1) for different reserved periods in the first set of reserved periods could be the same of different.

Whether an entry of the list of reserved period indicates the first number may be determined based on whether the reserved period is in or belonging to the first set of reserved periods or not. For period in the second set of reserved period, the entry indicative of the period may not or does not comprise the first number. For period in the first set of reserved period, the entry indicative of the period may comprise the first number. In other words, when reserved period field in a SCI indicates said entry, the first number could be provided.

Alternatively, whether an entry of the list of reserved period indicates usage of the first number may be determined based on whether the reserved period is in or belonging to the first set of reserved periods or not. For period in the second set of reserved period, the entry indicative of the period may not or does not indicate usage of the first number. Alternatively, an entry of the list of reserved period may indicate whether to use the first number or not.

Alternatively and/or additionally, each or one entry of the list of reserved period indicates a reserved period (e.g., 0, 1~99, 100:100:1000 ms) and/or a scaling time duration (e.g. Tscal). Alternatively and/or additionally, each or one entry of the list of reserved period indicates a reserved period (e.g., 0, 1~99, 100:100:1000 ms) and/or Tscal_1.

Whether an entry of the list of reserved period indicates Tscal_1 may be determined based on whether the reserved period is in or belonging to the first set of reserved periods or not. For period in the second set of reserved period, the entry indicative of the period may not or does not comprise Tscal_1. For period in the first set of reserved period, the entry indicative of the period may comprise Tscal_1. In other words, when reserved period field in a SCI indicates said entry, Tscal_1 could be provided.

In one embodiment, the first number may be explicitly indicated by SCI. The first number may also be indicated by resource reservation period field in SCI. The first number may be associated to an entry of the list indicative reserved period belonging to or in the first set of reserved period. The first number for each period in the first set of reserved periods could be different or the same. The first number for each period in the first set of reserved periods could be pre-defined.

In one embodiment, the third number could be specified in standard or (pre-) configured by higher layer signaling. The third number could be used for (maximum) number of future excluding resource(s) for period in the first set of reserved period. In other words, for period in the second set of reserved period, it may not be specified or (pre-)configured such number. The third number may be associated with CBR of the sidelink resource pool. The list may be (pre-) configured as being associated with a sidelink resource pool.

In one embodiment, Tscal_1 may be (pre-)configured as being associated with the sidelink resource pool. Tscal_1 may be explicitly indicated by SCI. Tscal_1 may be indicated by resource reservation period field in SCI. Tscal_1 may be specified in standard or (pre-) configured by higher layer signaling. Tscal_1 may be associated with an entry of the list indicative reserved period belonging to or in the first set of reserved period.

For a reserved period indicated by resource reservation period field in SCI and belonging to or in the first set of reserved period, the associated Tscal_1 could be derived or determined at least based on the reserved period value and T3. For a reserved period indicated by resource reservation period field in SCI and belonging to or in the first set of reserved period, the derivation of the associated Tscal_1 may at least comprise the addition of the reserved period value and T3.

Figure 8:
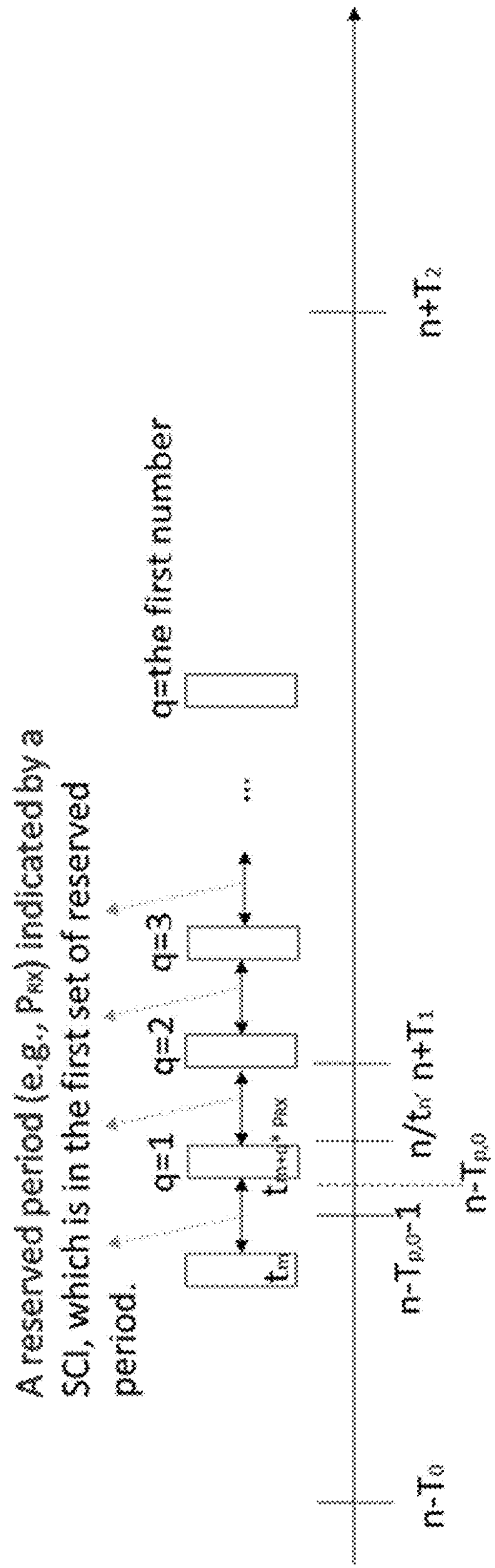
FIG. 8 is a diagram according to one exemplary embodiment.

The higher layer signaling could be PC5-RRC signaling. For example, as shown in FIG. 8, a device could receive a SCI in slot tm (during n−T0 to n−Tp,0−1), and the SCI could indicate a reserved period for reserving a resource (for different TB). The device could be triggered, in slot n, to perform resource (re-)identification and/or resource (re-) selection. The SCI could indicate a frequency resource assignment for sub-channels. The reserved period may be in the first set of reserved period. The reserved period may be denoted as PRX=2 ms. The first number may be derived as Tscal_1 dividing PRX or as indicating by the SCI. In this example, the device may consider candidate resource(s) overlapping with slot tm+q*PRX as excluding resource when performing resource identification and/or resource selection. Overlapping may imply candidate resource(s) partially or fully overlapped with the reserved resource indicated by the SCI with same frequency resource assignment in slot tm+q*PRX.

In this example, Tscal_1 could be different or is different from Tscal_2, 100 ms. Tscal_1 is 20 ms. The SCI could indicate like illustrated in FIG. 9. The middle column indicates reserved period and the right column (for period in the first set of reserved period) indicates the first number and/or Tscal_1. Tscal_1 and/or the first number for 2 ms or 1 ms in the first set of reserved periods could be the same or different. The right column (for period in the second set of reserved period) may not indicate the first number and/or Tscal_1, or may indicate the second number and/or Tscal_2.

Method b

The first number could be derived from a first window. Assuming the device is triggered, in slot n, to perform resource (re-)identification and/or resource (re-)selection, the first window could start from n+T1. Alternatively, the first window could start from n or after n. The number of resources associated with a reserved period in the first window may be excluded. The size of the first window could be smaller than the T2−T1. The ending slot or ending symbol or ending slot boundary for the first window could be earlier than n+T2. For a reserved resource derived to be reserved by a SCI, whether the device consider the reserved resource is excluded or not could be determined based on whether the reserved resource is in the first window or not. In other words, (only) reserved resource(s) derived to be reserved by a SCI with reserved period in the first set (of the reserved resource) in the first window would be derived as reserved. For reserved resource(s) derived to be reserved by a SCI with reserved in the first set (of the reserved resource) outside or latter than the first window, the device may consider as non-reserved. For reserved resource(s) derived to be reserved by a SCI with reserved period in the second set (of the reserved resource), no first window is considered. The second number could be derived from the selection window during n+T1 to n+T2.

Each or one codepoint of the resource reservation period field could be associated with one entry of a list of reserved period. Each or one entry of the list of reserved period could indicate a reserved period (e.g., 0, 1~99, 100:100:1000 ms) and/or size of the first window for the reserved period. In one embodiment, the first number for different reserved period could be the same or different. The size of the first window for different reserved periods in the first set of reserved periods could be the same or different.

Whether an entry of the list of reserved period indicates size of the first window could be determined based on whether the reserved period is in or belonging to the first set of reserved periods or not. For period in the second set of reserved period, the entry indicative of the period may not or does not comprise size of the first window. For period in the first set of reserved period, the entry indicative of the period may comprise size of the first window. In other words, when reserved period field in a SCI indicates said entry, size of the first window could be provided.

Alternatively, whether an entry of the list of reserved period indicates consideration/usage of the first window could be determined based on whether the reserved period is in or belonging to the first set of reserved periods or not. For reserved period in the second set of reserved period, the entry indicative of the period may not or does not indicate consideration or usage of the first window. Alternatively, an entry of the list of reserved period may indicate whether to consider or use the first window or not.

In one embodiment, the list could be (pre-)configured as being associated with a sidelink resource pool. The first window could be (pre-)configured as being associated with the sidelink resource pool. The size of the first window or the first window could be explicitly indicated by SCI. The size of the first window could be indicated by resource reservation period field in SCI. The size of the first window or the first window could be specified in standard or (pre-)configured by higher layer signaling. The size of the first window or the first window could be associated with an entry of the list indicative period belonging to or in the first set of reserved period.

For a reserved period indicated by resource reservation period field in SCI and belonging to or in the first set of reserved period, the size of the associated first window could be derived or determined at least based on the reserved period value and T3. For a reserved period indicated by resource reservation period field in SCI or belonging to or in the first set of reserved period, the derivation of the size of the associated first window may at least comprise addition of the reserved period value and T3.

Figure 10:
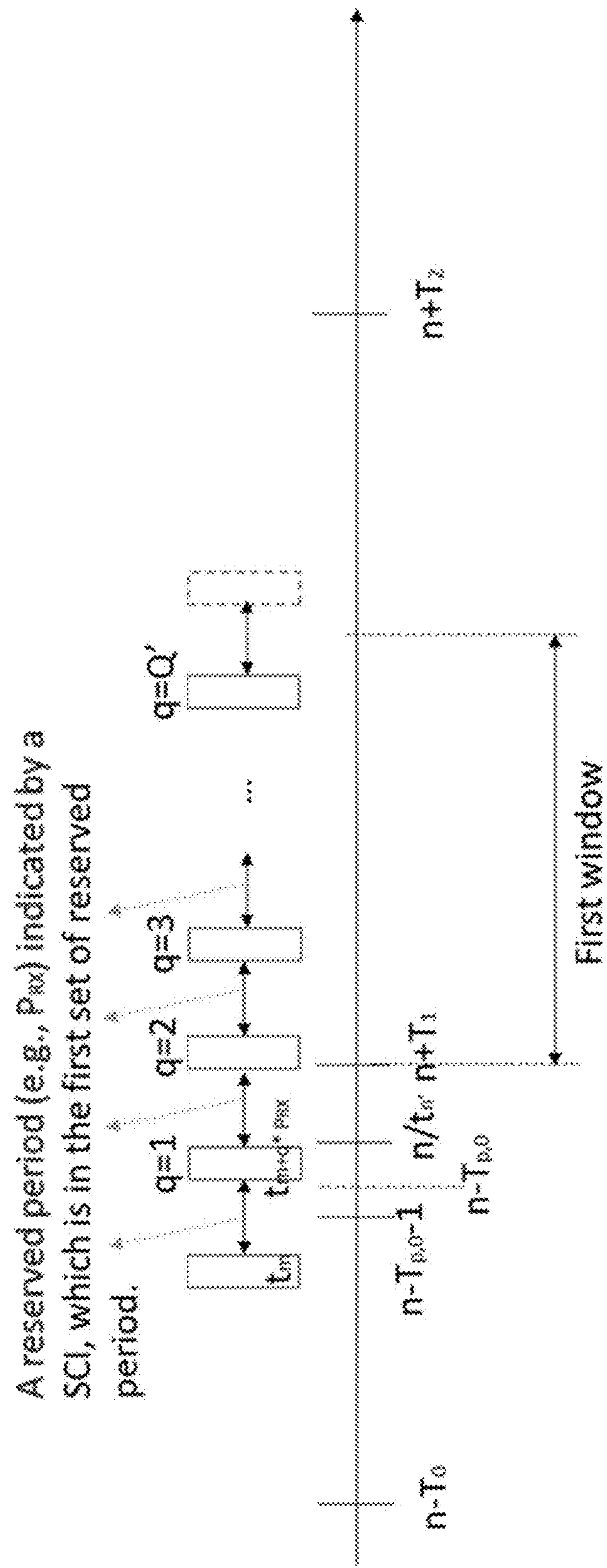
FIG. 10 is a diagram according to one exemplary embodiment.

The higher layer signaling could be PC5-RRC signaling. For example, as shown in FIG. 10, a device could receive a SCI in slot tm (during n−T0 to n−Tp,0−1), and the SCI could indicate a reserved period for reserving a resource (for different TB). The device could be triggered, in slot n, to perform resource (re-)identification and/or resource (re-) selection. The SCI could indicate a frequency resource assignment for sub-channels. The reserved period could be in the first set of reserved period. The reserved period is denoted as PRX=2 ms. The device, based on the first window, could derive the first number as Q'−2+1 or Q'. In this example, the device may consider candidate resource(s) overlapping with slot tm+q*PRX, q=2, . . . , Q' as excluding resources when performing resource identification and/or resource selection. Overlapping may imply candidate resource(s) partially or fully overlapped with the reserved resource indicated by the SCI with same frequency resource assignment in slot tm+q*PRX, q=2, . . . , Q'. For resource(s) or slots outside the first window (e.g., starting from ending of the first window to the slot or timing n+T2), the device may consider no reserved resource reserved by the SCI. If the period is in the second set of reserved period, the second number is 0 or 1 during n+T1 to n+T2 and/or determination of the second number may not be based on the first window.

Method c

The first number could be derived based on a first priority and a second priority. The first priority could be associated to or is the priority indicated by a (received) SCI. The second priority could be associated with or could be the priority indicated by higher layer of the device. The second priority may be derived or determined from a TB, which triggers the resource (re-)identification and/or resource (re-)selection. The second priority may be derived or determined from a TB, which will be transmitted or delivered via selected one or more resources.

The value range of the first priority could be from 0 to 7 or from 1 to 8. The value range of the second priority could be from 0 to 7 or from 1 to 8. There may be 64 different pairs of the first priority and the second priority. Each pair of the first priority and the second priority would be associated with the first number. Each pair of the first priority and the second priority could be associated with the same or different first number than a different pair of the first priority and the second priority.

Alternatively (e.g. combined with method a), each pair of the first priority and the second priority may be associated with a scaling time duration (e.g. Tscal). Each pair of the first priority and the second priority could be associated with the same or different scaling time duration (e.g. Tscal) than a different pair of the first priority and the second priority. Alternatively, each pair of the first priority and the second priority could be associated with whether to use a specific scaling time duration (e.g. Tscal_1). Each pair of the first priority and the second priority could be associated with the same or different usage of a specific scaling time duration (e.g. Tscal_1) than a different pair of the first priority and the second priority.

Alternatively (e.g. combined with method b), some pairs of the first priority and the second priority may be associated with the first window. Each of the some pair of the first priority and the second priority could be associated with the same or different size of the first window than different pair of the first priority and the second priority. Alternatively, each pair of the first priority and the second priority could be associated with whether to consider or use the first window. Each pair of the first priority and the second priority could be associated with the same or different consideration or usage of the first window than a different pair of the first priority and the second priority.

Alternatively, the first number could be derived based on (only) a first priority. The first priority could be associated with or could be the priority indicated by a (received) SCI. The value range of the first priority could be from 0 to 7 or from 1 to 8. The different value of the first priority may be associated with different or same first number.

Alternatively (e.g. combined with method a), the scaling time duration (e.g. Tscal) could be derived based on (only) a first priority. The different value of the first priority could be associated with same or different scaling time duration (e.g. Tscal). Alternatively, whether to use a specific scaling time duration (e.g. Tscal_1) could be derived or determined based on (only) a first priority. The different value of the first priority could be associated with same or different usage of a specific scaling time duration (e.g. Tscal_1).

Alternatively (e.g. combined with method b), the first window could be derived based on (only) the first priority. The first window could be derived based on some of the first priority. Different values of some of the first priority could be associated with same or different size of the first window. Alternatively, whether to consider or use the first window could be derived based on (only) the first priority. Different values of the first priority could be associated with same of different consideration or usage of the first window.

The first number associated with each pair of the first priority and the second priority could be (pre-)configured by higher layer signaling. The first number associated with each value of the first priority could be (pre-)configured by higher layer signaling. The higher layer signaling could be PC5-RRC signaling.

Method d

The first number (for the period in the first set) could be associated with or determined based on or is equal to the first number for an upper step level for the period. The upper step level could be a smallest value or equal value of upper step level for the period in the first set of reserved period. For example, a step level could be every 10 ms, and possible upper step level could be 10 ms, 20 ms, 30 ms, 40 ms, . . . , or 100 ms. For 1 ms~9 ms, 10 ms could be the upper step level for determining the first number. If number of reserved resources for 10 ms reserved period is 10, the first number for 1 ms~9 ms could be 10. Each step level shall be divisible by Tscal_2 and/or Tscal_1. In other words, Tscal_2 and/or Tscal_1 is integer multiple of each step level. Possible step level could be any combination from 2 ms, 4 ms, 5 ms, 10 ms, 20 ms, 25 ms, and 50 ms. Each step level could be larger than or equal to Tproc,0, Tproc,0+1 (in unit of slot with SCS associated to the sidelink resource pool). Each step level could be larger than or equal to 4 ms. Each step level could be larger than or equal to 2 ms.

FIG. 11 illustrates an example of Method d. For a period in the first set of reserved period, the first number could be derived based on most nearest upper step level. Alternatively, a step level could be used for deriving the first number of each period in the first set of reserved period. All periods in the first set of reserved periods could be smaller than or equal to the step level. For example, a step level with value 10 ms could be associated with 1~10 ms period in the first set of reserved period. In other words, 1~10 ms could be all possible elements in the first set of reserved period. For example, a step level with value 20 ms could be associated with 1~20 ms period in the first set of reserved period. In other words, 1~20 ms could be all possible elements in the first set of reserved period.

In one embodiment, higher layer of a device may (randomly) select a value for a reselection counter from an interval [X, Y] with equally probability. When the device selects the said value for a reselection counter for a period in the first set of reserved period, the device may perform scaling for the interval [X, Y]. Scaling interval could be (Tscal_1/step)*[X, Y] or (Tscal_2/step)*[X, Y] with ceil operation or floor operation.

In one embodiment, the reselection counter could be used for a count for number of reserved resource which the device could reserve based on the period. The reselection counter could be used for a count for number of transmission opportunities of different TBs which the device could reserve or use based on the period. A step could mean the largest reserved period in the first set of reserved period. A step (level) value associated with the first set of reserved periods could mean or be the largest reserved period value in the first set of reserved period. In one embodiment, the reselection counter could be SL_RESOURCE_RESELECTION_COUNTER. The number of reserved resource could be the selected value for the reselection counter times 10.

Each or one codepoint of the resource reservation period field could be associated with one entry of a list of reserved period. Each or one entry of the list of reserved period could indicate a reserved period (e.g., 0, 1~99, 100:100:1000 ms) and/or the step level for the reserved period. The step level for different reserved periods could be the same or different. The step level for different reserved periods in the first set of reserved periods could be the same of different.

Whether an entry of the list of reserved period indicates the step level could be determined based on whether the reserved period is in or belonging to the first set of reserved periods or not. For period in the second set of reserved period, the entry indicative of the period may not or does not comprise the step level. For period in the first set of reserved period, the entry indicative of the period may comprise the step level. In other words, when reserved period field in a SCI indicates said entry, the step level could be provided.

The list could be (pre-)configured as being associated with a sidelink resource pool. A step level could be (pre-)configured as being associated with the sidelink resource pool. A step level could be explicitly indicated by SCI. A step level could be indicated by resource reservation period field in SCI. A step level could be specified in standard or (pre-)configured by higher layer signaling. A step level could be associated with an entry of the list indicative reserved period belonging to or in the first set of reserved period. The higher layer signaling could be PC5-RRC signaling.

Method e

For the first number of reserved resource associated to a reserved period in the first of reserved period indicated by a SCI, one or more reserved resources, or one or more portion, or one or more position of reserved resources could be associated with different Reference Signal Received Power (RSRP) related information than that of indication derived from the SCI. The RSRP related information could be priority, and/or measured or derived RSRP. The different RSRP related information could be associated to a relaxed RSRP threshold for resource (re-)identification and/or resource (re-)selection. The relaxed RSRP threshold for resource (re-)identification and/or resource (re-)selection could be 3 dB higher than the threshold derived from the SCI. The different RSRP related information could be the information derived from the SCI. The different RSRP related information (for a second RSRP threshold for the one or more reserved resource(s)) could be larger than the information derived from the SCI (for a first RSRP threshold for remaining reserved resource(s)).

The one or more reserved resources, the one or more portions, or the one or more position of reserved resources may not be all of the first number of the reserved resource(s). The one or more reserved resources, the one or more portion, or the one or more position of reserved resources may be the last one or more resource(s). The one or more reserved resources, the one or more portion, or the one or more position of reserved resources may be half of the first number with ceil operation or floor operation. The one or more reserved resources, the one or more portion, or the one or more position of reserved resources may be indicated by a position bit-map. The size of the position bit-map could be larger than or equal to the first number. The most significant bit of the position bit-map could be associated with the first reserved resource with said period in the first set (in the selection window, i.e., n+T1 to n+T2).

Figure 12:
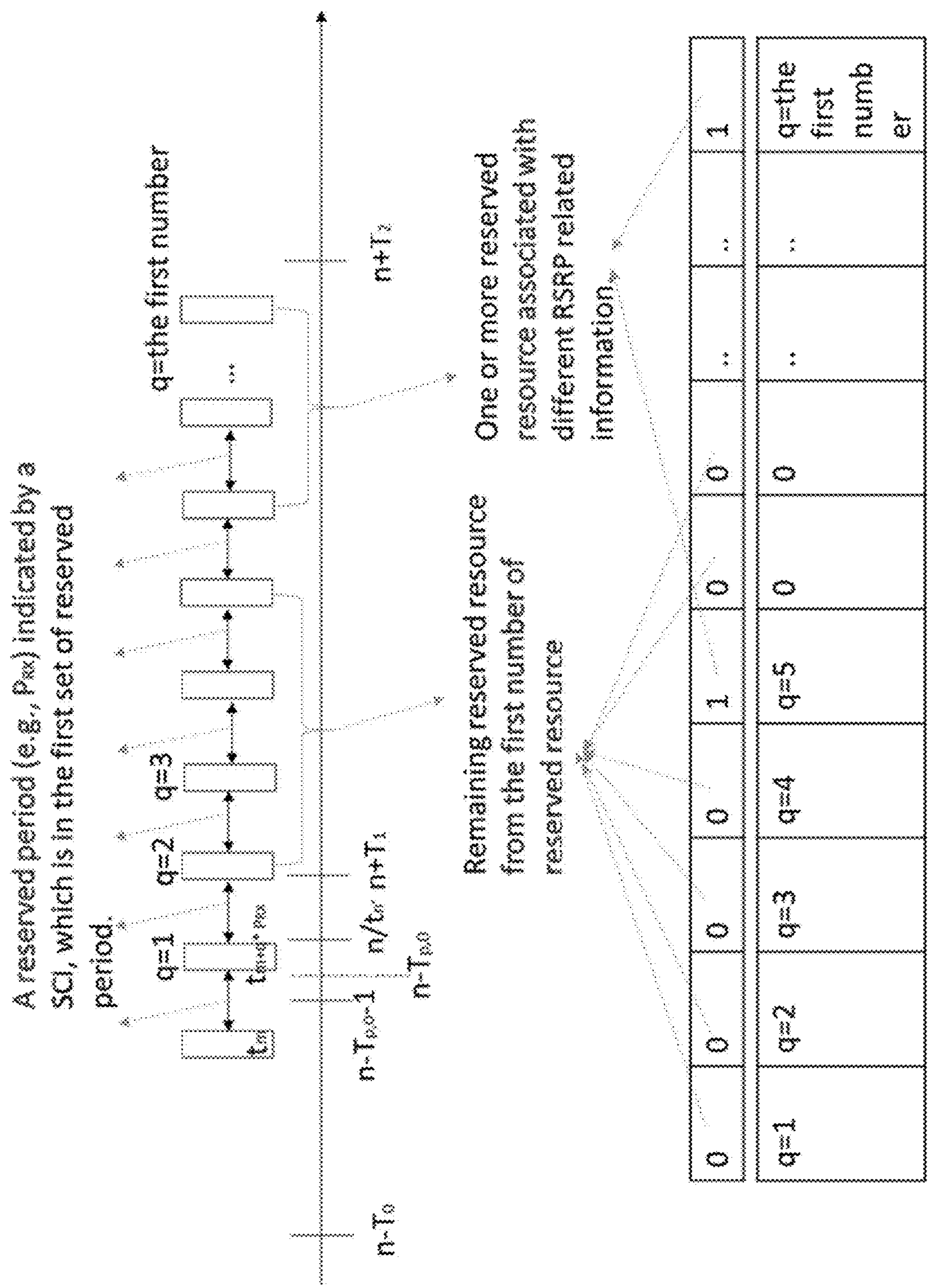
FIG. 12 is a diagram according to one exemplary embodiment.

FIG. 12 illustrates an example of the one or more reserved resources with different RSRP related information. In one embodiment, the position bit-map could indicate q=5 and q=the first number as the one or more reserved resource(s). The one or more reserved resources could be derived based on half of the first number with ceil operation or floor operation. The one or more reserved resources could be derived based on the first window (which the one or more reserved resources are outside or latter than the first window). The one or more reserved resources could be derived based on Tscal_1. The first number could be derived based on Tscal_2.

The number of the one or more reserved resources and/or the position bit-map could be (pre-)configured associated to the sidelink resource pool. The number of the one or more reserved resources and/or the position bit-map could be explicitly indicated by SCI. The number of the one or more reserved resources and/or the position bit-map could be indicated by reserved period field in SCI. The number of the one or more reserved resources and/or the position bit-map could be specified in standard or (pre-)configured by higher layer signaling. The number of the one or more reserved resources and/or the position bit-map could be associated with an entry of the list indicative period belonging to or in the first set of reserved period. The higher layer signaling could be PC5-RRC signaling.

In one embodiment, the first set of reserved periods may include or comprise reserved periods 1:1:99 ms. The first set of reserved periods may include or comprise reserved periods 1:1:9 ms. The first set of reserved periods may include or comprise reserved periods 1:1:19 ms. The first set of reserved periods may include or comprise reserved periods 1:1:2 ms. The first set of reserved periods may include or comprise reserved periods 1:1:3 ms. The first set of reserved periods may include or comprise reserved periods 1:1:4 ms.

In one embodiment, the first set of reserved periods could be determined based on SCS associated to the sidelink resource pool. The first set of reserved periods could be determined based on T0, T1, T2, and/or T3 and/or Tproc,0 and/or Tproc,1. The first set of reserved periods may include or comprise period larger than or equal to a time duration. The time duration could be Tproc,0+1 slots with SCS associated to the sidelink resource pool.

In one embodiment, the second set of reserved periods may include or comprise reserved periods other than 1:1:99 ms. The second set of reserved periods may include or comprise reserved periods other than 1:1:9 ms. The second set of reserved periods may include or comprise reserved periods other than 1:1:19 ms. The second set of reserved periods may include or comprise reserved periods other than 1:1:2 ms. The second set of reserved periods may include or comprise reserved periods other than 1:1:3 ms. The second set of reserved periods may include or comprise reserved periods other than 1:1:4 ms. The second set of reserved periods may include or comprise reserved period 0 ms. The second set of reserved periods may include or comprise reserved periods other than 100:100:1000 ms.

In one embodiment, the second set of reserved periods and the first set of reserved periods may include or comprise exclusive or non-overlapped (positive) period values. For positive period values, all reserved periods in the first set could be smaller or shorter than all reserved periods in the second set. For period values larger than the time duration, all reserved periods in the first set could be smaller or shorter than all reserved periods in the second set. The time duration could be Tproc,0+1 slots with SCS associated to the sidelink resource pool.

In one embodiment, the second set of reserved periods and the first set of reserved periods may be divided or separated based on a specific period value. The specific periodic value may be determined based on SCS associated to the sidelink resource pool. The specific periodic value may be determined based on T0, T1, T2, and/or T3 and/or Tproc,0 and/or Tproc,1. The specific periodic value may be specified in standard or (pre-)configured by higher layer signaling. The specific periodic value may be smaller than 100 ms. The specific periodic value may be smaller than 5 or 10 or 20 ms.

Second Concept

One general concept of the invention is that (pre-)configuration for or of a sidelink resource pool shall ensure that each period other than 0 ms in a list of reserved period is larger than or equal to a time duration. The time duration could be Tproc,0+1 slots with SCS associated with the sidelink resource pool. A network may not be allowed or may prevent or prohibit from providing configuration of a sidelink resource pool or from configuring a sidelink resource pool with a list of reserved period such that at least one positive period in the list is with value smaller than the time duration. A device with a capability of processing under Tproc,0 could perform sidelink transmission in the sidelink resource pool. In other words, for a device with a capability of processing not meeting Tproc,0 (e.g. processing time>Tproc,0), the device may not be allowed to perform sidelink transmission in the sidelink resource pool.

Alternatively, the resource exclusion (based on scaling number) could be performed if n−m−Tproc, $0 \le P_{RX}$ or $n-m \le P_{RX}$+Tproc,0. One benefit of the second concept could be to guarantee re-evaluation processing time. One motivation of the second concept could be currently for resource (re-)identification and/or resource (re-)selection triggered in slot n, when the device receives a SCI in slot m indicating a reserved period $P_{RX}$ (ms) during the sensing window (e.g. during n−T0 to n−Tproc,0−1), the resource exclusion based on scaling number could be performed if $n-m \le P_{RX}$.

However, in some scenarios, the device may not be able to perform resource exclusion for some reserved period(s). In an example where $P_{RX}=1$ (ms), if Tproc,0 is 1 slot and if m=n−1, the device cannot perform resource exclusion associated with the received SCI since the SCI is outside sensing window. If Tproc,0 is 1 slot and if m≤n−2, the device cannot perform resource exclusion associated with the received SCI since $n-m>P_{RX}$. Thus, the device cannot perform resource exclusion for $P_{RX}=1$ (ms). In an example where Tproc,0 has 2 slots, if $P_{RX}=1$ or 2 (ms) and if m=n−1 or m=n−2, the device cannot perform resource exclusion associated with the received SCI since the SCI is outside sensing window. If $P_{RX}=1$ or 2 (ms) and if m≤n−3, the device cannot perform resource exclusion associated with the received SCI since $n-m>P_{RX}$. Thus, the device cannot perform resource exclusion for $P_{RX}=1$ or 2 (ms). As a result, the second concept is to limit (pre-)configuration for or of a sidelink resource pool excludes this reserved period(s). The second concept could be to provide (or adjust) a condition for applying or performing the resource exclusion (based on scaling number). Otherwise, third concept may be applied.

Figure 13:
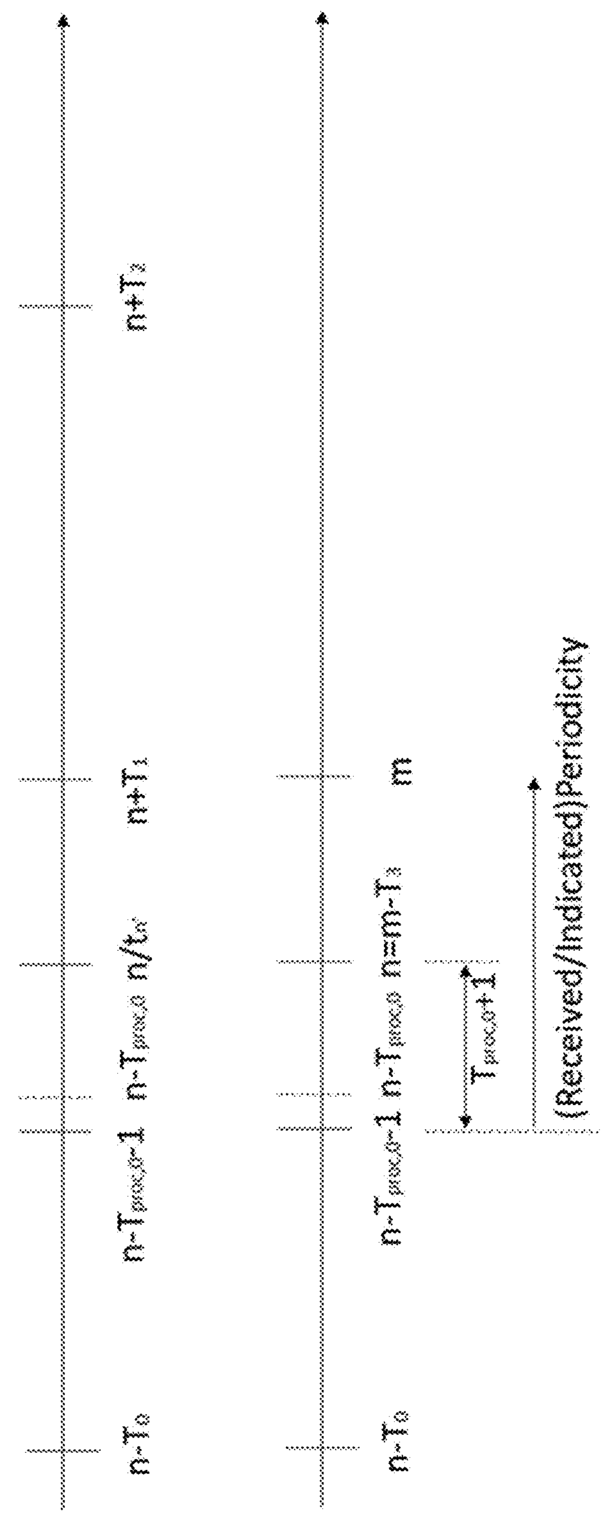
FIG. 13 is a diagram according to one exemplary embodiment.

For example, as illustrated in the example shown FIG. 13, the SCI received during Tproc,0+1 starting from timing n-Tproc,0+1 does not guarantee enough processing time for reevaluation to detect reserved resource with shorter period with collision or severe interference from the SCI.

Text proposal 1

The following steps are used:

1) A candidate single-slot resource for transmission $R_{x,y}$ is defined as a set of $L_{subCH}$ contiguous sub-channels with sub-channel x + j in slot $t_y^{SL}$ where j = 0, . . . , $L_{subCH} - 1$. The UE shall assume that any set of $L_{subCH}$ contiguous sub-channels included in the corresponding resource pool within the time interval [n + $T_1$, n + $T_2$] correspond to one candidate single-slot resource, where selection of $T_1$ is up to UE implementation under $0 \le T_1 \le T_{proc,1}$, where $T_{proc,1}$ is TBD;

If $T_{2min}$ is shorter than the remaining packet delay budget (in slots) then $T_2$ is up to UE implementation subject to $T_{2min} \le T_2 \le$ remaining packet budget (in slots); otherwise $T_2$ is set to the remaining packet delay budget (in slots).

The total number of candidate single-slot resources is denoted by $M_{total}$.

2) The sensing window is defined by the range of slots [n − $T_0$, n − $T_{proc,0}$) where $T_0$ is defined above and $T_{proc,0}$ is TBD. The UE shall monitor slots which can belong to a sidelink resource pool within the sensing window except for those in which its own transmissions occur. The UE shall perform the behaviour in the following steps based on PSCCH decoded and RSRP measured in these slots.

3) The internal parameter $Th(p_i)$ is set to the corresponding value from higher layer parameter SL-ThresRSRP_pi_pj for $p_j$ equal to the given value of $prio_{TX}$ and each priority value $p_i$.

4) The set $S_A$ is initialized to the set of all the candidate single-slot resources.

5) The UE shall exclude any candidate single-slot resource $R_{x,y}$ from the set $S_A$ if it meets all the following conditions:

the UE has not monitored slot $t_m^{SL}$ in Step 2.

for any periodicity value allowed by the higher layer parameter reservationPeriodAllowed and a hypothetical SCI format 0-1 received in slot $t_m^{SL}$ with "Resource reservation period" field set to that periodicity value and indicating all subchannels of the resource pool in this slot, condition c in step 6 would be met.

6) The UE shall exclude any candidate single-slot resource $R_{x,y}$ from the set $S_A$ if it meets all the following conditions:

a. the UE receives an SCI format 0-1 in slot $t_m^{SL}$, and "Resource reservation period" field, if present, and "Priority" field in the received SCI format 0-1 indicate the values $P_{rsvp\_RX}$ and $prio_{RX}$, respectively according to Subclause [TBD] in [6, TS 38.213];

b. the RSRP measurement performed, according to subclause 8.4.2.1 for the received SCI format 0-1, is higher than $Th(prio_{RX})$;

c. the SCI format received in slot $t_m^{SL}$ or the same SCI format which, if and only if the "Resource reservation period" field is present in the received SCI format 0-1, is assumed to be received in slot(s) $t_{m+q\times P_{rsvp\_RX}'}^{SL}$ determines according to subclause [TBD] in [6, TS 38.213] the set of resource blocks and slots which overlaps with $R_{x,y+j\times P_{rsvp\_TX}'}$ for q = 1, 2, . . . , Q and j = 0, 1, . . . , $C_{resel} - 1$. Here, $P_{rsvp\_RX}'$ is $P_{rsvp\_RX}$ converted to units of logical slots, $$Q = \left\lceil \frac{T_{scal}}{P_{rsvp\_RX}} \right\rceil \text{ if } P_{rsvp\_RX} < T_{scal} \text{ and } n' - m$$

~~$-T_{proc,0}$~~ $\le P_{rsvp\_RX}'$ ,where $t_n'^{SL} = n$ if slot n belongs to the set ($t_0^{SL}$, $t_1^{SL}$, . . . , $t_{T_{max}}^{SL}$), otherwise slot $t_n'^{SL}$ is the first slot after slot n belonging to the set ($t_0^{SL}$, $t_1^{SL}$, . . . , $t_{T_{max}}^{SL}$); otherwise Q = 1. $T_{scal}$ is FFS.

7) If the number of candidate single-slot resources remaining in the set $S_A$ is smaller than $0.2 \cdot M_{total}$, then $Th(p_i)$ is increased by 3 dB for each priority value $Th(p_i)$ and the procedure continues with step 4.

The UE shall report set $S_A$ to higher layers.

For a first device performing sidelink transmission in a sidelink resource pool, the first device could be configured with the sidelink resource pool, wherein the sidelink resource pool is with enabled resource reservation for different TB. The first device could receive a first SCI indicating a first reserved period in slot m. The first device could be triggered to perform resource identification and/or resource selection in slot n. The first device could derive whether to perform resource exclusion associated to the first SCI based on a condition. The first reserved period could be (associated to) one or more specific reserved period, (e.g., 1 ms and/or 2 ms and/or 3 ms). The first reserved period could be $P_{RX}$.

The condition could be n−m−Tproc,0≤$P_{RX}$, or n−m≤$P_{RX}$+Tproc,0. The condition could be the interval or distance between slot m plus a processing time, and slot n (in unit of slot or milliseconds) could be smaller than or equal to the first reserved period. The condition could be the interval or distance between the slot m and the slot n (which could be in unit of slot or milliseconds and which could be smaller than or equal to the first reserved period) plus or add a processing time. The processing time could be Tproc,0 and/or the processing time used for processing SCI reception. The slot n could be latter than the slot m in time domain. If the condition is satisfied, the first device could perform resource exclusion associated with the first SCI. If the condition is not satisfied, the first device may not perform resource exclusion associated with the first SCI. The first device may perform resource exclusion based on a scaling number. The scaling number could be associated with a first scaling time duration, a second scaling time duration, and/or the first reserved period. The scaling number could be the first scaling time duration or the first reserved period with ceil operation or floor operation.

Third Concept

One general concept of the invention is that for some specific reserved period(s), resource exclusion based on scaling number is not performed. Assuming a device is triggered (in slot n) to perform resource (re-)identification and/or resource (re-)selection, when the device receives a SCI indicating one of the some specific reserved period(s) (during the sensing window, e.g. during n−T0 to n−Tproc, 0−1), the device may not perform associated resource exclusion based on scaling number. The device could perform associated resource exclusion for an associated exclusion time duration. In one embodiment, the exclusion time duration may be derived based on the indicated reserved period and/or T3. The exclusion time duration may be from n+T1 to n+the indicated reserved period +T3. In one embodiment, n+the indicated reserved period +T3 could be smaller than or equal to n+T2.

In one embodiment, the specific reserved period(s) may be determined based on SCS associated to the sidelink resource pool. The specific reserved period(s) may be determined based on T0, T1, T2, and/or T3 and/or Tproc,0 and/or Tproc,1. The specific reserved period(s) may be specified in standard or (pre-)configured by higher layer signaling. The specific reserved period(s) may be smaller than 5 or 10 ms. The some specific reserved period(s) may be 1 ms or 2 ms.

In general, the motivation of third concept is to avoid dense resource exclusion due to shorter reserved period(s). Thus, associated resource exclusion based on scaling number is not applied. It depends on resource (re-)evaluation procedure for a selected resource to avoid potential resource collision associated with reserved resources of the received SCI. To ensure applicability of resource (re-)evaluation procedure, the device may require to perform associated resource exclusion for the associated exclusion time duration. Accordingly, the associated exclusion time duration may be derived or determined based on the indicated reserved period of the received SCI and/or T3. In one embodiment, the received SCI may indicate a set of sub-channel(s) in the frequency region. The device could exclude the set of sub-channel(s) in the slots during the associated exclusion time duration.

For a first device performing sidelink transmission in a sidelink resource pool, the first device could be configured with the sidelink resource pool. The sidelink resource pool could be with enabled resource reservation for different TB. The first device could be configured with a list of reserved period. One or more entry could be indicative of periods in a first set of reserved periods or a second set of reserved periods. The first device could receive a first SCI indicating a first reserved period in the first set of reserved period. The first device could derive or identify a set of candidate resource from a resource selection window. The first device could exclude resource(s) partially or fully overlapping with a first number of reserved resources associated to the first SCI. The first device could select one or more resource(s) from the set of candidate resource for performing sidelink transmission.

The first device could derive or identify the set of candidate resource based on sensing result and/or SCI reception result during a the first device's sensing window. The first number of reserved resources could be associated with different TBs. The first number could be larger than 1. The first number of reserved resources may not span the resource selection window based on the first reserved period. The first number of reserved resources could span the resource selection window based on the first reserved period. The first device could derive or measure a first RSRP based on resources scheduled by the first SCI. The first device could receive a second SCI indicating a second reserved period in the second set of reserved period. The first device could exclude resource(s) partially or fully overlapping with a second number of reserved resources associated to the second SCI. The first device could receive or detect the first SCI and/or the second SCI in the first device's sensing window. The second number of reserved resources could be associated to different TBs. The second number could be at most 1 or could be equal to 1. The first device could derive or measure a second RSRP based on resources scheduled by the second SCI. The first SCI and/or the second SCI could indicate a first priority, and/or higher layer of the first device provides a second priority.

The first number could be derived from a first scaling time duration, and the second number could be derived from a second scaling time duration, wherein the first scaling time duration is different from the second scaling time duration. The first number could be derived from function of the first scaling time duration, the first reserved period, and/or a third number. The third number could be used for maximum number of future excluding resource(s) for the first period. The first scaling time duration could be Tscal_1, and/or the second scaling time duration could be Tscal_2 or Tscal. Each codepoint of the reserved period field could be associated with one entry of the list of reserved period. Each or one entry of the list of reserved period could indicate a reserved period and/or the first number for the reserved period. One or more entry indicative of periods in the first set of reserved periods could indicate the first number or the first scaling time duration. One or more entry indicative of periods in the second set of reserved periods may not indicate the second number nor the second scaling time duration.

The first number could be derived from a first window. The first window could start from the start (or starting boundary) of the resource selection window. The first number of reserved resources associated with the first reserved period are within the first window. Part of the first number of reserved resources associated with the first reserved period could be within the first window. The first device may not consider a resource with the first reserved period associated with the first SCI as a reserved resource if the resource is outside or latter than the first window. Each or one entry of the list of reserved period could indicate a reserved period and/or size of the first window for the first reserved period. One or more entry indicative of periods in the first set of reserved periods may indicate the size of the first window. One or more entry indicative of periods in the second set of reserved periods may not indicate size of the first window.

The first number could be derived based on the first priority and the second priority. The first number could be derived based on the first priority. Each pair of the first priority and the second priority could be associated with different or the same the first number. Different values of the first priority may or is associated with different or same the first number.

The first device could exclude resource(s) partially or fully overlapping with the first number of reserved resources associated with the first SCI additionally if the derived or measured RSRP (first RSRP) is higher than a first RSRP threshold or a second RSRP threshold. The first device could exclude resource(s) partially or fully overlapping with the second number of reserved resources associated with the second SCI additionally if the derived or measured RSRP (second RSRP) is higher than a first RSRP threshold. The first RSRP threshold and/or the second RSRP threshold could be used in the first time of iteration for resource identification. The first RSRP threshold could be associated with or derived from the first priority and the second priority.

The second RSRP threshold could be derived from the first RSRP threshold. The set of candidate resource could be derived from Z % of an or all amount of candidate resource within or during the resource selection window. Z could be 20. Z could be (pre-)configured. If the first device cannot derive the set of candidate resource by the first time of iteration, the first device could increase 3 dB for all threshold associated to each pair of the first priority and the second priority, and/or could perform second time of iteration for identifying the set of candidate resource via the increased threshold. During the second iteration, the second RSRP threshold could also be increased with 3 dB, and/or the second RSRP threshold could be 3 dB larger than the increased first RSRP threshold. The first device could stop increase until the set of candidate resource is derived.

One or more reserved resources among the first number of reserved resources associated to the first reserved period (a second portion of the first number of reserved resources) could be associated with a second RSRP threshold. The first number of reserved resources associated with the first reserved resources excluding the one or more reserved resources (a first portion of the first number of reserved resources) could be associated with a first RSRP threshold. The one or more reserved resources (the second portion of the first number of reserve resources) may not be all of the first number of the reserved resources. The one or more reserved resources may be the last one or more resource(s) among the first number of reserved resources. The one or more reserved resources is half of the first number, preferably with ceil operation or floor operation. The one or more reserved resources could be derived based on the first window (which the one or more reserved resources are outside or latter than the first window). The one or more reserved resources could be indicated by a position bit-map.

The first RSRP threshold could be different from the second RSRP threshold. The first RSRP threshold could be 3 dB less than the second RSRP threshold. The second RSRP could be a relaxed threshold for deriving or identifying the set of candidate resource. The first number could be derived based on Tscal_2 or Tscal.

The first device could be triggered to identify a set of resource and/or resource selection in slot with index n (or an equivalent slot index in the sidelink resource pool tn'). A sensing window (associated to the triggered time) could be n−T0 to n−Tproc,0−1 or n−T0 to n−Tproc,0. A (resource) selection window (associated to the triggered time) could be n+T1 to n+T2. Tproc,0 could be processing time for decoding one or more SCI in a sensing window. T0 could be size of a sensing window. T0 could be 100 ms or 1000 ms. Tproc,0 could be 1, 2, 4, or 5 slots with SCS associated with the sidelink resource pool. Tproc,0 could be associated with SCS of the sidelink resource pool. T1 could be 0 ms to Tproc,1. Tproc,1 could be processing time for resource identification (e.g., identify or derive the set of candidate resource) and resource selection. T1 could be 0 ms to 4 ms. T2 could be 20 ms to 100 ms. T2 could be T2 min to remaining packet delay budget. T2 could be remaining packet delay budget. T3 could be processing time for resource re-identification (e.g., identify or derive the set of candidate resource) and resource (re-)selection.

For all Above Concepts, Methods, Alternatives and Embodiments:

The first SCI and/or the second SCI could be transmitted from a second device. The first device and/or the second device could be a vehicle UE, a pedestrian UE, a TX UE, or a RSU performing sidelink transmission. The first device and/or the second device could be a pedestrian UE or battery concerned UE or UE concerning power saving. The network could be a gNB, eNB, base station, network node, or TRP. The sidelink transmission could be transmitted via PC5 interface. RSRP could be (L1-) SL-RSRP.

T0, T1, T2, and/or T3 and/or Tproc,0 and/or Tproc,1 could be in units of slot. T0, T1, T2, and/or T3 and/or Tproc,0 and/or Tproc,1 could be in units of millisecond which is equivalent to units of slot with SCS associated to the sidelink resource pool or sidelink BWP. For example, Tproc,0=1 slot in a sidelink resource pool or sidelink BWP with SCS=30 kHz. Tproc,0 in units of millisecond could be 0.5 millisecond (since 1 slot with SCS 30 kHz is 0.5 ms).

Any above concepts, alternatives and embodiments and text proposal may be combined or applied simultaneously.

Figure 14:
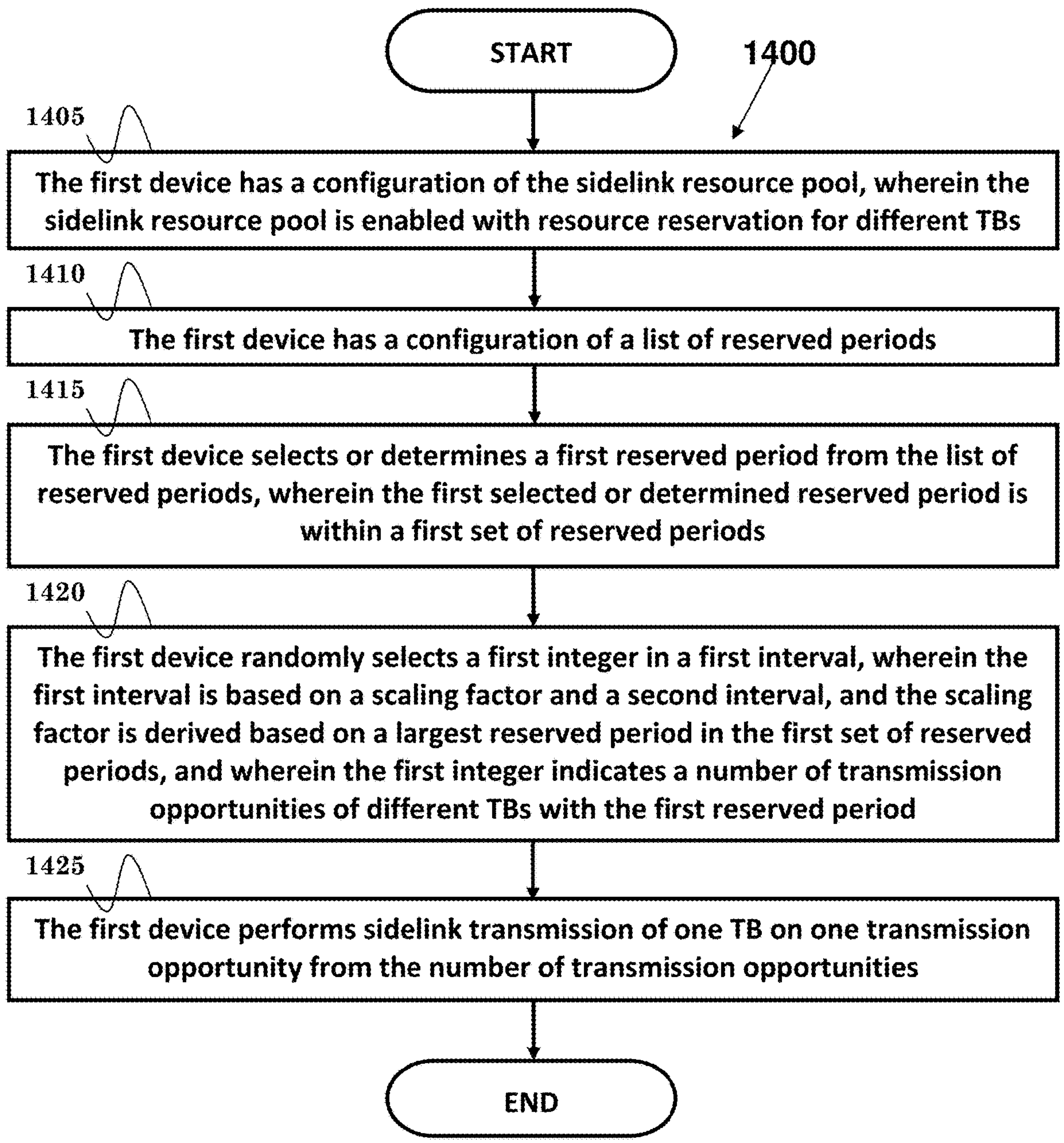
FIG. 14 is a flow chart according to one exemplary embodiment.

FIG. 14 is a flow chart 1400 according to one exemplary embodiment from the perspective of a first device for performing sidelink transmission in a sidelink resource pool. In step 1405, the first device has a configuration of the sidelink resource pool, wherein the sidelink resource pool is enabled with resource reservation for different TBs. In step 1410, the first device has a configuration of a list of reserved periods. In step 1415, the first device selects or determines a first reserved period from the list of reserved periods, wherein the first selected or determined reserved period is within a first set of reserved periods. In step 1420, the first device randomly selects a first integer in a first interval, wherein the first interval is based on a scaling factor and a second interval, and the scaling factor is derived based on a largest reserved period in the first set of reserved periods, and wherein the first integer indicates a number of transmission opportunities of different TBs with the first reserved period. In step 1425, the first device performs sidelink transmission of one TB on one transmission opportunity from the number of transmission opportunities.

In one embodiment, the first device could select or determine a second reserved period from the list of reserved periods, wherein the second reserved period is within a second set of reserved periods, and the first device randomly selects a second integer in the second interval.

In one embodiment, the second interval could be between a first integer number and a second integer number, and the second interval could include the first integer number and the second integer number. The second interval could start at the first integer number, and could ending at the second integer number. The first integer number could be 5, and the second integer number could be 15. The second interval could be [5, 15].

In one embodiment, the first interval could be derived via the second interval times the scaling factor. The first interval based on the scaling factor and the second interval could be determined or derived via the second interval times the scaling factor. The first interval based on the scaling factor and the second interval could be equal to a derived interval via the second interval times the scaling factor. The first interval could be between the first integer number times the scaling factor and the second integer number times the scaling factor, and the first interval could include the first integer number times the scaling factor and the second integer number times the scaling factor. The first interval could start at the first integer number times the scaling factor, and could end at the second integer number times the scaling factor. The first interval could be [the scaling factor*5, the scaling factor*15].

In one embodiment, the first device could set a counter to the first integer. Furthermore, when the value of the counter is non-zero, the first device could perform the sidelink transmission on the one transmission opportunity from the number of transmission opportunities.

In one embodiment, the scaling factor could be a value divided by the largest reserved period in the first set of reserved periods, with ceil operation. The value could be 100.

In one embodiment, the first set of reserved periods may comprise reserved periods from 1:1:20. The second set of reserved periods may comprise reserve periods from 100:100:1000. The first reserved period may not be the largest reserved period in the first set of reserved periods. The scaling factor may not be derived based on the value of the first reserved period when the first reserved period is not the largest reserved period in the first set of reserved periods.

Referring back to FIGS. 3 and 4, in one exemplary embodiment of a first device for performing sidelink transmission in a sidelink resource pool. The first device 300 includes a program code 312 stored in the memory 310. The CPU 308 could execute program code 312 to enable the first device (i) to have a configuration of the sidelink resource pool, wherein the sidelink resource pool is enabled with resource reservation for different TBs, (ii) to as a configuration of a list of reserved periods, (iii) to select or determine a first reserved period from the list of reserved periods, wherein the first selected or determined reserved period is within a first set of reserved periods, (iv) to randomly select a first integer in a first interval, wherein the first interval is based on a scaling factor and a second interval, and the scaling factor is derived based on a largest reserved period in the first set of reserved periods, and wherein the first integer indicates a number of transmission opportunities of different TBs with the first reserved period, and (v) to perform sidelink transmission of one TB on one transmission opportunity from the number of transmission opportunities. Furthermore, the CPU 308 can execute the program code 312 to perform all of the above-described actions and steps or others described herein.

Figure 15:
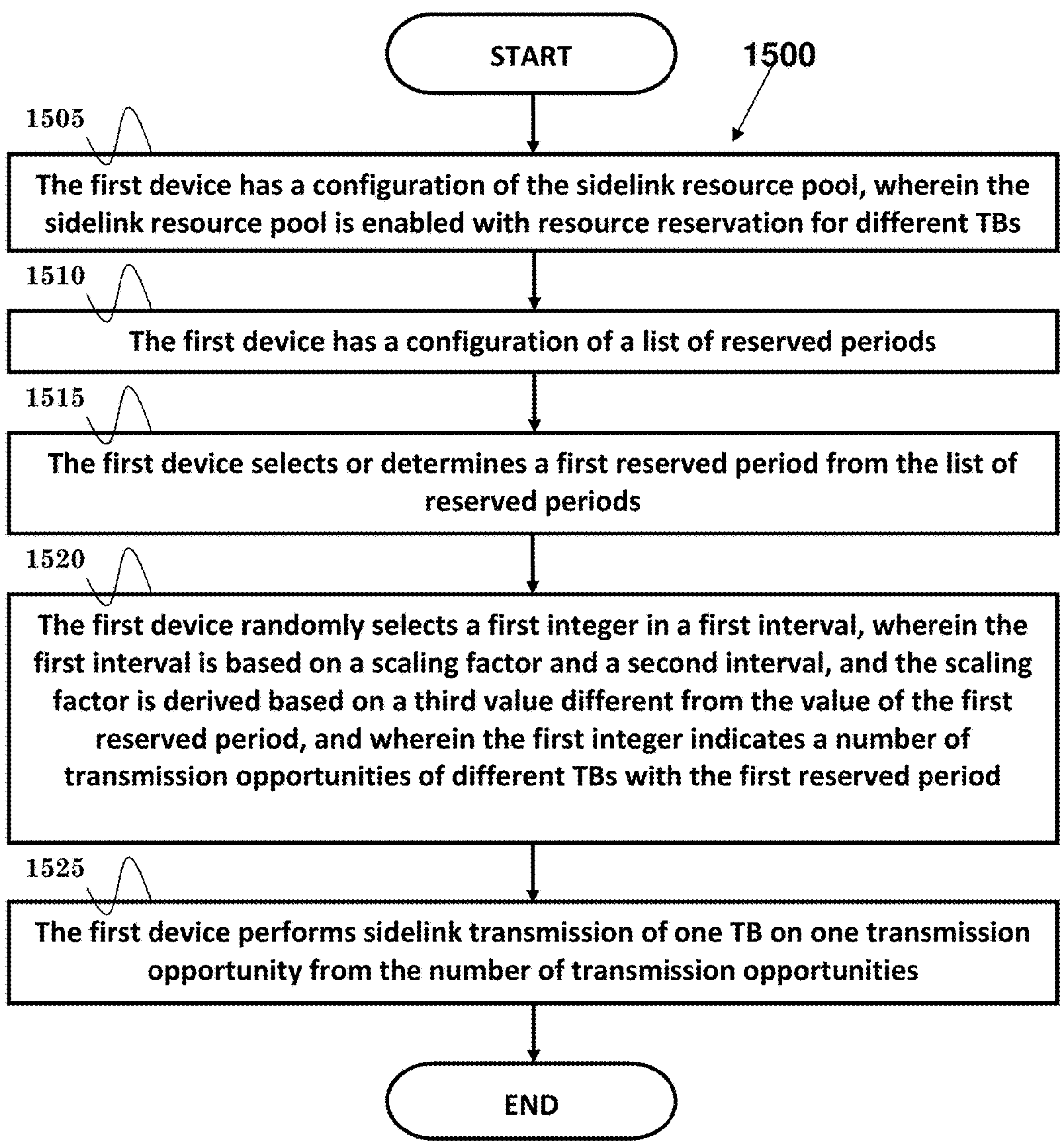
FIG. 15 is a flow chart according to one exemplary embodiment.

FIG. 15 is a flow chart 1500 according to one exemplary embodiment from the perspective of a first device for performing sidelink transmission in a sidelink resource pool. In step 1505, the first device has a configuration of the sidelink resource pool, wherein the sidelink resource pool is enabled with resource reservation for different Transport Blocks (TBs). In step 1510, the first device has a configuration of a list of reserved periods. In step 1515, the first device selects or determines a first reserved period from the list of reserved periods. In step 1520, the first device randomly selects a first integer in a first interval, wherein the first interval is based on a scaling factor and a second interval, and the scaling factor is derived based on a third value different from the value of the first reserved period, and wherein the first integer indicates a number of transmission opportunities of different TBs with the first reserved period. In step 1525, the first device performs sidelink transmission of one TB on one transmission opportunity from the number of transmission opportunities.

In one embodiment, the first reserved period could be any one of reserved periods from 1:1:19. The first reserved period could be within a first set of reserved periods, and the first set of reserved periods comprises a reserved period with the third value; and/or the first set of reserved periods comprises reserved periods from 1:1:20.

In one embodiment, the first device could select or determine a second reserved period from the list of reserved periods, wherein the second reserved period could be any one of reserved periods from 100:100:1000; and the first device could randomly select a second integer in the second interval.

In one embodiment, the second interval could be between a first integer number and a second integer number, and the second interval could include the first integer number and the second integer number. The second interval could start at the first integer number, and could end at the second integer number. The first integer number could be 5, and the second integer number could be 15. The second interval could be [5, 15].

In one embodiment, the first interval could be derived via the second interval times the scaling factor. The first interval based on the scaling factor and the second interval could be determined or derived via the second interval times the scaling factor. The first interval based on the scaling factor and the second interval could be equal to a derived interval via the second interval times the scaling factor. The first interval could be between the first integer number times the scaling factor and the second integer number times the scaling factor, and the first interval could include the first integer number times the scaling factor and the second integer number times the scaling factor. The first interval could start at the first integer number times the scaling factor, and could end at the second integer number times the scaling factor. The first interval could be [the scaling factor*5, the scaling factor*15].

In one embodiment, the first device could set a counter to the first integer. Furthermore, when the value of the counter is non-zero, the first device could perform the sidelink transmission on the one transmission opportunity from the number of transmission opportunities.

In one embodiment, the scaling factor could be a value divided by the third value, with ceil operation. The scaling factor may not be derived based on the value of the first reserved period. The value could be 100, the third value could be 20, and/or the third value could be a fixed value.

In one embodiment, the first reserved period may not be the largest reserved period in the first set of reserved periods. The scaling factor may not be derived based on the value of the first reserved period when the first reserved period is not the largest reserved period in the first set of reserved periods.

Referring back to FIGS. 3 and 4, in one exemplary embodiment of a first device for performing sidelink transmission in a sidelink resource pool. The first device 300 includes a program code 312 stored in the memory 310. The CPU 308 could execute program code 312 to enable the first device (i) to have a configuration of the sidelink resource pool, wherein the sidelink resource pool is enabled with resource reservation for different TBs, (ii) to have a configuration of a list of reserved periods, (iii) to select or determine a first reserved period from the list of reserved periods, (iv) to randomly select a first integer in a first interval, wherein the first interval is based on a scaling factor and a second interval, and the scaling factor is derived based on a third value different from the value of the first reserved period, and wherein the first integer indicates a number of transmission opportunities of different TBs with the first reserved period, and (v) to perform sidelink transmission of one TB on one transmission opportunity from the number of transmission opportunities. Furthermore, the CPU 308 can execute the program code 312 to perform all of the above-described actions and steps or others described herein.

Figure 16:
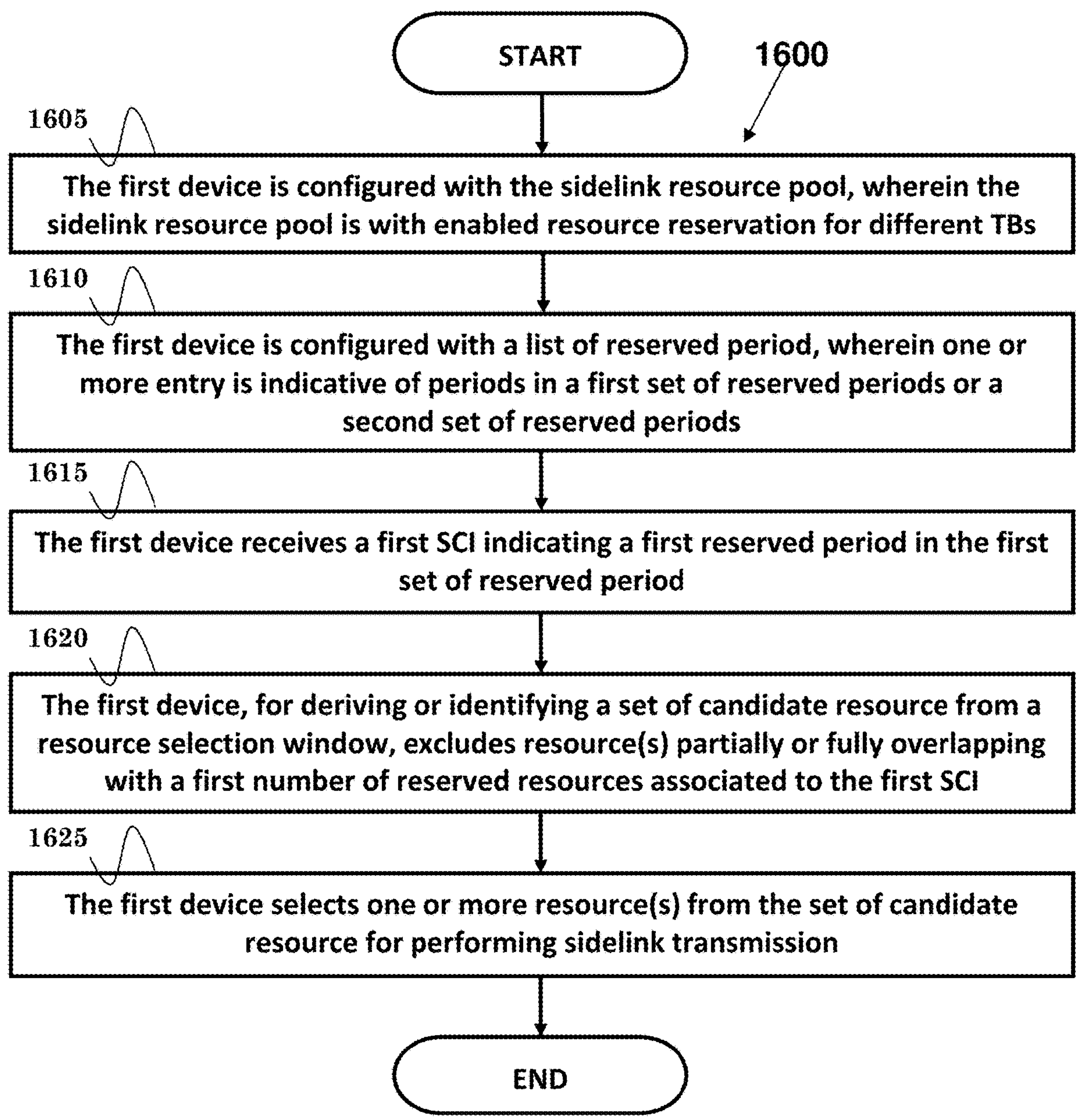
FIG. 16 is a flow chart according to one exemplary embodiment.

FIG. 16 is a flow chart 1600 according to one exemplary embodiment from the perspective of a first device for performing sidelink transmission in a sidelink resource pool. In step 1605, the first device is configured with the sidelink resource pool, wherein the sidelink resource pool is with enabled resource reservation for different TBs. In step 1610, the first device is configured with a list of reserved period, wherein one or more entry is indicative of periods in a first set of reserved periods or a second set of reserved periods. In step 1615, the first device receives a first SCI indicating a first reserved period in the first set of reserved period. In step 1620, the first device, for deriving or identifying a set of candidate resource from a resource selection window, excludes resource(s) partially or fully overlapping with a first number of reserved resources associated to the first SCI. In step 1625, the first device selects one or more resource(s) from the set of candidate resource for performing sidelink transmission.

In one embodiment, the first device could derive or identify the set of candidate resource based on sensing result and/or SCI reception result during the first device's sensing window. The first number of reserved resources could be associated with different TBs. The first number could be larger than 1. The first number of reserved resources may not span the resource selection window based on the first reserved period. The first number of reserved resources could span the resource selection window based on the first reserved period.

In one embodiment, the first device could derive or measure first RSRP based on resources scheduled by the first SCI. The first device could receive a second SCI indicating a second reserved period in the second set of reserved period. The first device could exclude resource(s) partially or fully overlapping with a second number of reserved resources associated to the second SCI. The first device could receive or detect the first SCI and/or the second SCI in the first device's sensing window. The first device could derive or measure a second RSRP based on resources scheduled by the second SCI.

In one embodiment, the second number of reserved resources could be associated with different TBs. The second number may be at most 1 or may equal to 1. The first SCI and/or the second SCI could indicate a first priority, and/or a higher layer of the first device could provide a second priority.

In one embodiment, the first number could be derived from a first scaling time duration and the second number could be derived from a second scaling time duration, wherein the first scaling time duration is different from the second scaling time duration. The first number could also be derived from a function of the first scaling time duration and/or the first reserved period and/or a third number, wherein the third number is used for maximum number of future excluding resource(s) for the first period.

In one embodiment, the first scaling time duration could be Tscal_1, and/or the second scaling time duration is Tscal_2 or Tscal. Each codepoint of the reserved period field could be associated with one entry of the list of reserved period. Each or one entry of the list of reserved period could indicate a reserved period and/or the first number for the reserved period. One or more entries indicative of periods in the first set of reserved periods could indicate the first number or the first scaling time duration. One or more entries indicative of periods in the second set of reserved periods may not indicate the second number nor the second scaling time duration.

In one embodiment, the first number could be derived from a first window. The first window could start from starting or starting boundary of the resource selection window. The first number of reserved resources associated to the first reserved period could be within the first window. Part of the first number of reserved resources associated to the first reserved period could be within the first window.

In one embodiment, the first device does not consider a resource with the first reserved period associated to the first SCI as a reserved resource if the resource is outside or latter than the first window. Each or one entry of the list of reserved period could indicate a reserved period and/or size of the first window for the first reserved period. One or more entries indicative of periods in the first set of reserved periods indicates size of the first window. One or more entries indicative of periods in the second set of reserved periods does not indicate size of the first window.

In one embodiment, the first number could be derived based on the first priority and the second priority. The first number could be derived based on the first priority. Each pair of the first priority and the second priority could be associated with different or the same the first number. Different values of the first priority may be or is associated to different or same the first number.

In one embodiment, the first device could exclude resource(s) partially or fully overlapping with the first number of reserved resources associated to the first SCI additionally if the first RSRP is higher than a first RSRP threshold or a second RSRP threshold. The first device could exclude resource(s) partially or fully overlapping with the second number of reserved resources associated to the second SCI additionally if the derived or measured RSRP (second RSRP) is higher than a first RSRP threshold. The first RSRP threshold and/or the second RSRP threshold could be used in the first time of iteration for resource identification. The first RSRP threshold could be associated or derived from the first priority and the second priority. The second RSRP threshold could be derived from the first RSRP threshold.

In one embodiment, one or more reserved resources among the first number of reserved resources associated to the first reserved period (a second portion of the first number of reserved resources) is associated with a second RSRP threshold. The first number of reserved resources associated with the first reserved resources excluding the one or more reserved resources (a first portion of the first number of reserved resources) could be associated with a first RSRP threshold. The one or more reserved resources (the second portion of the first number of reserve resources) may not be all of the first number of the reserved resources. The one or more reserved resources may be the last one or more resource(s) among the first number of reserved resources. The one or more reserved resources may be half of the first number, with ceil operation or floor operation. The one or more reserved resources could be derived based on the first window (which the one or more reserved resources are outside or latter than the first window). The one or more reserved resources could be indicated by a position bit-map.

In one embodiment, the first RSRP threshold could be different from the second RSRP threshold. The first RSRP threshold could be 3 dB less than the second RSRP threshold. The second RSRP could be a relaxed threshold for deriving or identifying the set of candidate resource. The first number could be derived based on Tscal_2 or Tscal.

In one embodiment, the first set of reserved periods may include or comprise reserved periods 1:1:9 ms. The first set of reserved periods may include or comprise reserved periods 1:1:19 ms. The first set of reserved periods may include or comprise reserved periods other than 1:1:9 ms. The first set of reserved periods may include or comprise reserved periods other than 1:1:19 ms.

Referring back to FIGS. 3 and 4, in one exemplary embodiment of a first device for performing sidelink transmission in a sidelink resource pool. The first device 300 includes a program code 312 stored in the memory 310. The CPU 308 could execute program code 312 to enable the first device (i) to be configured with the sidelink resource pool, wherein the sidelink resource pool is with enabled resource reservation for different TBs, (ii) to be configured with a list of reserved period, wherein one or more entry is indicative of periods in a first set of reserved periods or a second set of reserved periods, (iii) to receive a first SCI indicating a first reserved period in the first set of reserved period, (iv) for deriving or identifying a set of candidate resource from a resource selection window, to exclude resource(s) partially or fully overlapping with a first number of reserved resources associated to the first SCI, and (v) to select one or more resource(s) from the set of candidate resource for performing sidelink transmission. Furthermore, the CPU 308 can execute the program code 312 to perform all of the above-described actions and steps or others described herein.

Figure 17:
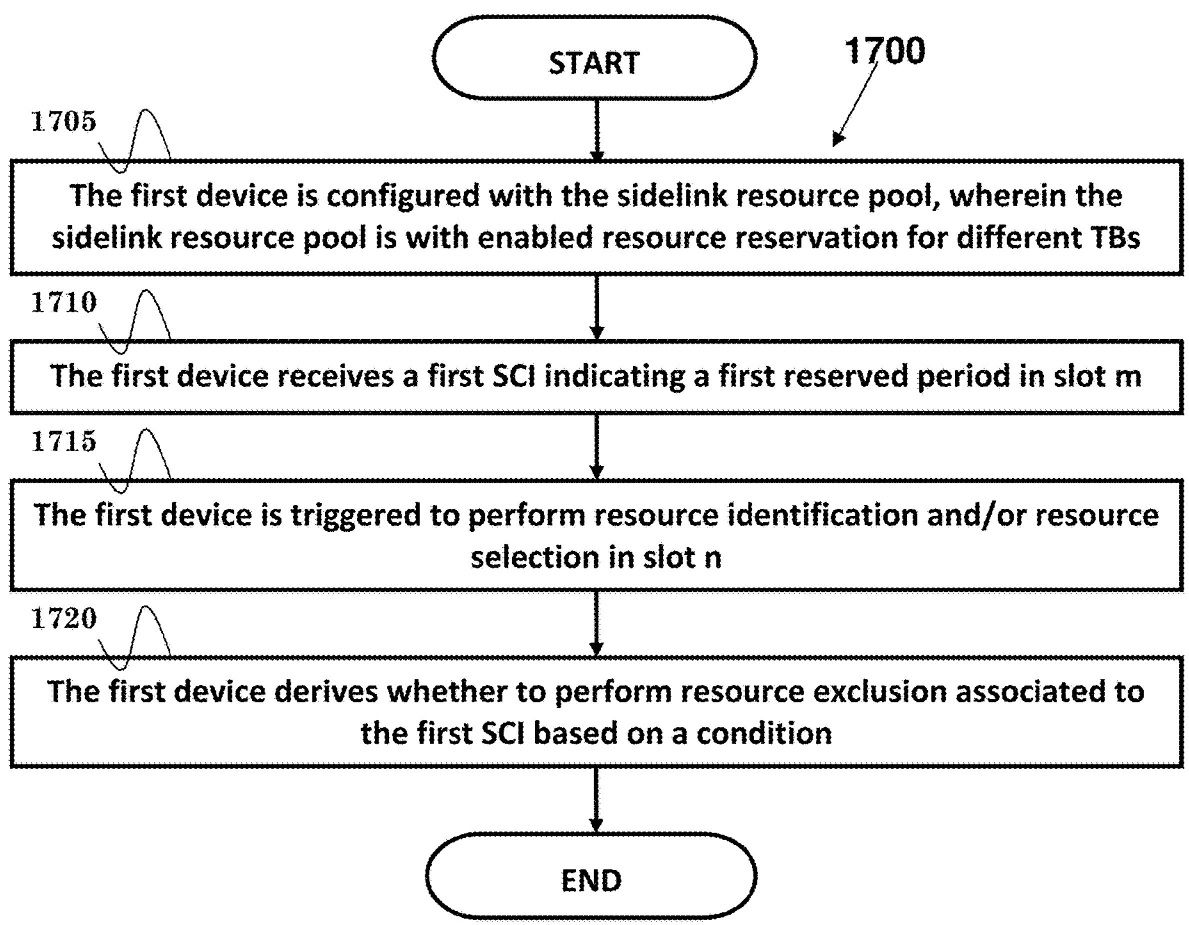
FIG. 17 is a flow chart according to one exemplary embodiment.

FIG. 17 is a flow chart 1700 according to one exemplary embodiment from the perspective of a first device for performing sidelink transmission in a sidelink resource pool. In step 1705, the first device is configured with the sidelink resource pool, wherein the sidelink resource pool is with enabled resource reservation for different TBs. In step 1710, the first device receives a first SCI indicating a first reserved period in slot m. In step 1715, the first device is triggered to perform resource identification and/or resource selection in slot n. In step 1720, the first device derives whether to perform resource exclusion associated to the first SCI based on a condition.

In one embodiment, the first reserved period could be (associated with) one or more specific reserved period (e.g., 1 ms and/or 2 ms and/or 3 ms). The first reserved period could be $P_{RX}$. The condition could be n−m−Tproc,0≤$P_{RX}$, or n−m≤$P_{RX}$+Tproc,0.

In one embodiment, the condition could be an interval or distance between slot m plus a processing time and slot n (in unit of slot or milliseconds) is smaller than or equal to the first reserved period. The condition could be an interval or distance between the slot m and the slot n (in unit of slot or milliseconds) is smaller than or equal to the first reserved period plus or add a processing time.

In one embodiment, the processing time could be Tproc,0, and/or the processing time could be used for processing SCI reception. The slot n could be latter than the slot m in time domain. If the condition is satisfied, the first device could perform resource exclusion associated to the first SCI. If the condition is not satisfied, the first device may not perform resource exclusion associated to the first SCI. The first device could perform resource exclusion based on a scaling number. The scaling number could be associated to a first scaling time duration, a second scaling time duration, and/or the first reserved period. The scaling number could be the first scaling time duration or the first reserved period, with ceil operation or floor operation.

Referring back to FIGS. 3 and 4, in one exemplary embodiment of a first device for performing sidelink transmission in a sidelink resource pool. The first device 300 includes a program code 312 stored in the memory 310. The CPU 308 could execute program code 312 to enable the first device (i) to be configured with the sidelink resource pool, wherein the sidelink resource pool is with enabled resource reservation for different TBs, (ii) to receive a first SCI indicating a first reserved period in slot m, (iii) to be triggered to perform resource identification and/or resource selection in slot n, and (iv) to derive whether to perform resource exclusion associated to the first SCI based on a condition. Furthermore, the CPU 308 can execute the program code 312 to perform all of the above-described actions and steps or others described herein.

Figure 18:
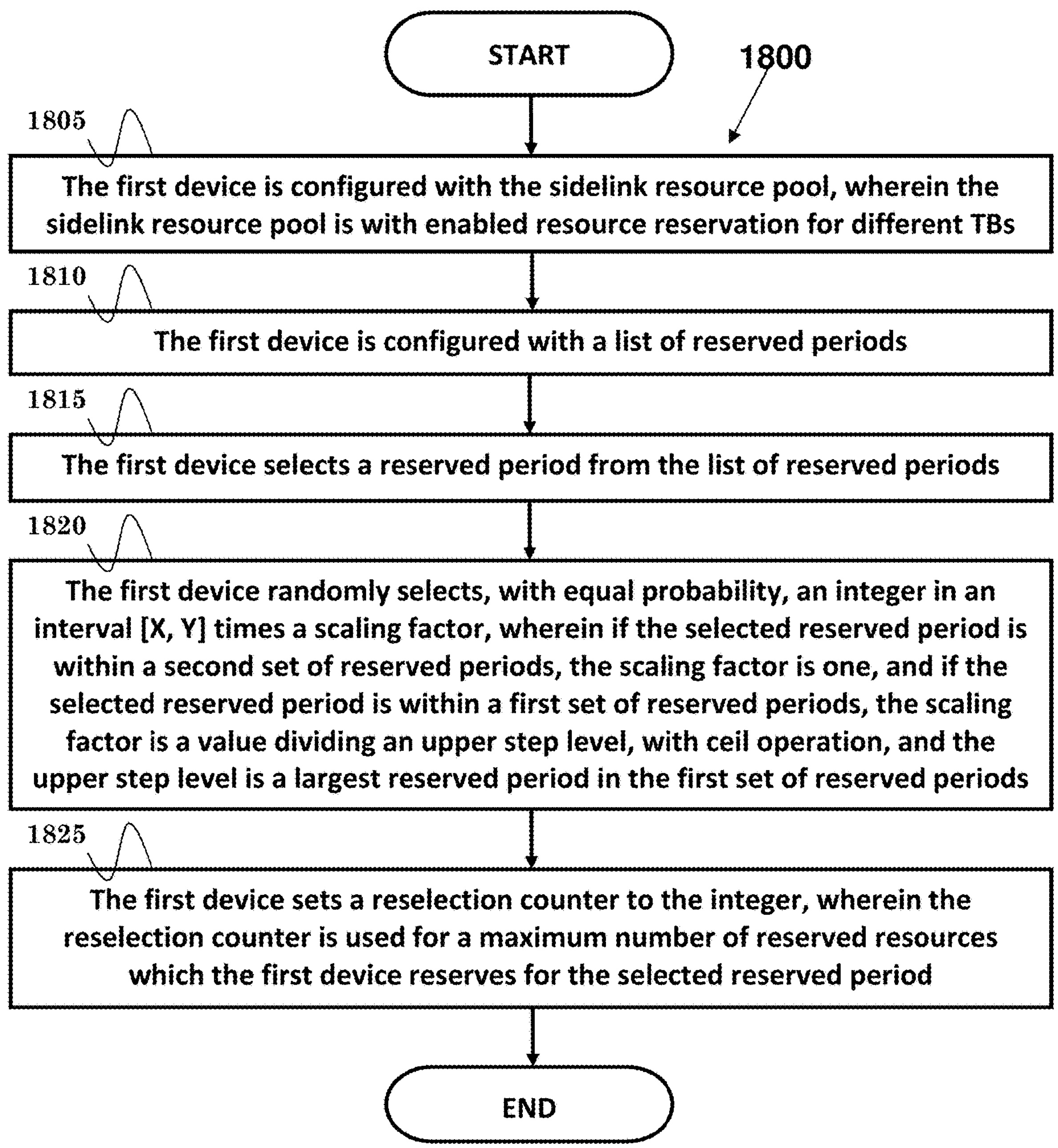
FIG. 18 is a flow chart according to one exemplary embodiment.

FIG. 18 is a flow chart 1800 according to one exemplary embodiment from the perspective of a first device for performing sidelink transmission in a sidelink resource pool. In step 1805, the first device is configured with the sidelink resource pool, wherein the sidelink resource pool is with enabled resource reservation for different TBs. In step 1810, the first device is configured with a list of reserved periods. In step 1815, the first device selects a reserved period from the list of reserved periods. In step 1820, the first device randomly selects, with equal probability, an integer in an interval [X, Y] times a scaling factor, wherein if the selected reserved period is within a second set of reserved periods, the scaling factor is one, and if the selected reserved period is within a first set of reserved periods, the scaling factor is a value dividing an upper step level, with ceil operation, and the upper step level is a largest reserved period in the first set of reserved periods. In step 1825, the first device sets a reselection counter to the integer, wherein the reselection counter is used for a maximum number of reserved resources which the first device reserves for the selected reserved period.

In one embodiment, the first set of reserved periods may comprise reserved periods from 1:1:20. The second set of reserved periods may comprise reserve periods from 100:100:1000. The upper step level could be 20. The value could be 100. The scaling factor could be derived from the value and the upper step level rather than being derived from the value and the selected reserved period.

Referring back to FIGS. 3 and 4, in one exemplary embodiment of a first device for performing sidelink transmission in a sidelink resource pool. The first device 300 includes a program code 312 stored in the memory 310. The CPU 308 could execute program code 312 to enable the first device (i) to be configured with the sidelink resource pool, wherein the sidelink resource pool is with enabled resource reservation for different TBs, (ii) to be configured with a list of reserved periods, (iii) to select a reserved period from the list of reserved periods, (iv) to randomly select, with equal probability, an integer in an interval [X, Y] times a scaling factor, wherein if the selected reserved period is within a second set of reserved periods, the scaling factor is one, and if the selected reserved period is within a first set of reserved periods, the scaling factor is a value dividing an upper step level, with ceil operation, and the upper step level is a largest reserved period in the first set of reserved periods, and (v) to set a reselection counter to the integer, wherein the reselection counter is used for a maximum number of reserved resources which the first device reserves for the selected reserved period. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a first device performing sidelink transmission in a sidelink resource pool, comprising:

the first device has a configuration of the sidelink resource pool, wherein the sidelink resource pool is enabled with resource reservation for different Transport Blocks (TBs);

the first device has a configuration of a list of reserved periods;

the first device selects or determines a first reserved period from the list of reserved periods, wherein the first selected or determined reserved period is within a first set of reserved periods;

the first device randomly selects a first integer in a first interval, wherein the first interval is starting at a first integer number times a scaling factor and ending at a second integer number times the scaling factor, and the scaling factor is derived based on a largest reserved period in the first set of reserved periods, and wherein the first integer is used for deriving or determining a number of transmission opportunities of different TBs with the first reserved period; and the first device performs sidelink transmission on one transmission opportunity from the number of transmission opportunities.

2. The method of claim 1, further comprising:

the first device selects or determines a second reserved period from the list of reserved periods, wherein the second reserved period is within a second set of reserved periods, and the first device randomly selects a second integer in a second interval; and/or wherein the second interval is between the first integer number and the second integer number, and wherein the second interval includes the first integer number and the second integer number; and/or wherein the second interval is starting at the first integer number and ending at the second integer number; and/or wherein the second interval is [5, 15].

3. The method of claim 1, wherein the first integer number is 5, and the second integer number is 15.

4. The method of claim 1, wherein the first interval is derived or determined via a second interval times the scaling factor; and/or wherein the first interval is between the first integer number times the scaling factor and the second integer number times the scaling factor, and wherein the first interval includes the first integer number times the scaling factor and the second integer number times the scaling factor; and/or wherein the first interval is [the scaling factor*5, the scaling factor*15].

5. The method of claim 1, further comprising:

the first device sets a counter to the first integer; and/or when the value of the counter is non-zero, the first device performs the sidelink transmission on the one transmission opportunity from the number of transmission opportunities.

6. The method of claim 1, wherein the scaling factor is a value divided by the largest reserved period in the first set of reserved periods, with ceil operation; and/or wherein the value is 100.

7. The method of claim 1, wherein the first set of reserved periods comprises reserved periods from 1:1:20.

8. The method of claim 2, wherein the second set of reserved periods comprises reserve periods from 100:100:1000.

9. The method of claim 1, wherein the first reserved period is not the largest reserved period in the first set of reserved periods; and/or wherein the scaling factor is not derived based on the value of the first reserved period when the first reserved period is not the largest reserved period in the first set of reserved periods.

10. A method of a first device performing sidelink transmission in a sidelink resource pool, comprising:

the first device has a configuration of the sidelink resource pool, wherein the sidelink resource pool is enabled with resource reservation for different Transport Blocks (TBs);

the first device has a configuration of a list of reserved periods;

the first device selects or determines a first reserved period from the list of reserved periods;

the first device randomly selects a first integer in a first interval, wherein the first interval is starting at a first integer number times a scaling factor and ending at a second integer number times the scaling factor, and the scaling factor is derived based on a third value different from the value of the first reserved period, and wherein the first integer is used for deriving or determining a number of transmission opportunities of different TBs with the first reserved period; and the first device performs sidelink transmission on one transmission opportunity from the number of transmission opportunities.

11. The method of claim 10, wherein the first reserved period is any one of reserved periods from 1:1:19, and/or the third value is 20, and/or the third value is a fixed value.

12. The method of claim 10, wherein the first reserved period is within a first set of reserved periods, and the first set of reserved periods comprises a reserved period with the third value, and/or wherein the first set of reserved periods comprises reserved periods from 1:1:20.

13. The method of claim 10, further comprising:

the first device selects or determines a second reserved period from the list of reserved periods, wherein the second reserved period is any one of reserved periods from 100:100:1000, and the first device randomly selects a second integer in a second interval; and/or wherein the second interval is between the first integer number and the second integer number, and wherein the second interval includes the first integer number and the second integer number; and/or wherein the second interval is starting at the first integer number and ending at the second integer number; and/or wherein the second interval is [5, 15].

14. The method of claim 10, wherein the first integer number is 5, and the second integer number is 15.

15. The method of claim 10, wherein the first interval is derived or determined via a second interval times the scaling factor; and/or wherein the first interval is between the first integer number times the scaling factor and the second integer number times the scaling factor, and wherein the first interval includes the first integer number times the scaling factor and the second integer number times the scaling factor; and/or wherein the first interval is [the scaling factor*5, the scaling factor*15].

16. The method of claim 10, further comprising:

the first device sets a counter to the first integer; and/or when the value of the counter is non-zero, the first device performs the sidelink transmission on the one transmission opportunity from the number of transmission opportunities.

17. The method of claim 10, wherein the scaling factor is a value divided by the third value, with ceil operation; and/or wherein the scaling factor is not derived based on the value of the first reserved period; and/or wherein the value is 100.

18. The method of claim 12, wherein the first reserved period is not the largest reserved period in the first set of reserved periods, and/or wherein the scaling factor is not derived based on the value of the first reserved period when the first reserved period is not the largest reserved period in the first set of reserved periods.

19. A first device for performing sidelink transmission in a sidelink resource pool, comprising:

a control circuit;

a processor installed in the control circuit; and a memory installed in the control circuit and operatively coupled to the processor;

wherein the processor is configured to execute a program code stored in the memory to:

have a configuration of the sidelink resource pool, wherein the sidelink resource pool is enabled with resource reservation for different Transport Blocks (TBs);

have a configuration of a list of reserved periods;

select or determine a first reserved period from the list of reserved periods, wherein the first selected or determined reserved period is within a first set of reserved periods;

select randomly a first integer in a first interval, wherein the first interval is starting at a first integer number times a scaling factor and ending at a second integer number times the scaling factor, and the scaling factor is derived based on a largest reserved period in the first set of reserved periods, and wherein the first integer is used for deriving or determining a number of transmission opportunities of different TBs with the first reserved period; and perform sidelink transmission on one transmission opportunity from the number of transmission opportunities.

20. The first device of claim 19, wherein the processor is further configured to execute a program code stored in the memory to:

select or determine a second reserved period from the list of reserved periods, wherein the second reserved period is within a second set of reserved periods, and the first device randomly selects a second integer in a second interval; and/or wherein the second interval is between the first integer number and the second integer number, and wherein the second interval includes the first integer number and the second integer number; and/or wherein the second interval is starting at the first integer number and ending at the second integer number; and/or wherein the second interval is [5, 15].

* * * * *